United States Patent
Honda et al.

(10) Patent No.: US 11,393,639 B2
(45) Date of Patent: Jul. 19, 2022

(54) SEAL PLATE, CAPACITOR AND METHOD FOR MANUFACTURING SEAL PLATE

(71) Applicant: NIPPON CHEMI-CON CORPORATION, Tokyo (JP)

(72) Inventors: Ikufumi Honda, Tokyo (JP); Hiroyuki Wakabayashi, Tokyo (JP); Masayuki Mori, Tokyo (JP); Masaru Saito, Tokyo (JP); Takashi Kuroki, Tokyo (JP); Kazuo Matsushita, Tokyo (JP); Atsushi Koga, Tokyo (JP); Ryoichi Yasuda, Tokyo (JP); Koji Hoshino, Tokyo (JP); Masahiro Matsushima, Tokyo (JP); Keita Yajima, Tokyo (JP)

(73) Assignee: NIPPON CHEMI-CON CORPORATION, Tokyo (JP)

( * ) Notice: Subject to any disclaimer, the term of this patent is extended or adjusted under 35 U.S.C. 154(b) by 104 days.

(21) Appl. No.: 16/954,809

(22) PCT Filed: Dec. 19, 2018

(86) PCT No.: PCT/JP2018/046763
§ 371 (c)(1),
(2) Date: Jun. 17, 2020

(87) PCT Pub. No.: WO2019/124435
PCT Pub. Date: Jun. 27, 2019

(65) Prior Publication Data
US 2021/0098200 A1 Apr. 1, 2021

(30) Foreign Application Priority Data
Dec. 20, 2017 (JP) .............................. JP2017-243728

(51) Int. Cl.
*H01G 9/12* (2006.01)
*H01G 9/00* (2006.01)
*H01G 9/10* (2006.01)

(52) U.S. Cl.
CPC ............. *H01G 9/12* (2013.01); *H01G 9/0029* (2013.01); *H01G 9/10* (2013.01)

(58) Field of Classification Search
None
See application file for complete search history.

(56) References Cited

U.S. PATENT DOCUMENTS 9,437,368 B2 * 9/2016 Mori ........................ H01G 9/08
2012/0328913 A1 * 12/2012 Chuang ................... H01G 2/103
429/54

(Continued)

FOREIGN PATENT DOCUMENTS

CN 101341562 B * 4/2013 ............. H01G 11/20
CN 103946939 A 7/2014

(Continued)

OTHER PUBLICATIONS

Extended (Supplementary) European Search Report dated Sep. 3, 2021, issued in counterpart EP Application No. 18891289.3 (8 pages).

(Continued)

*Primary Examiner* — Dion R. Ferguson
(74) *Attorney, Agent, or Firm* — WHDA, LLP

(57) ABSTRACT

A seal plate (2) seals an opening part of a capacitor case (an exterior case 52) and includes a main body part (4) including a through-hole (8) for discharging a gas (G) in the capacitor case, a pressure valve (12) arranged to cover the through-hole and including a valve body part (26) allowing passage of the gas, a storage part (16) formed in the through-hole to receive the valve body part expanded due to a pressure in the (Continued)

capacitor case, and a stopper (stopper wall 10) that includes an opening part (20) for discharging the gas passing through the valve body part and that comes into contact with a portion of the valve body part in the storage part to deform the valve body part. This achieves an increase in gas permeability of the pressure valve and a high operating pressure maintained in the pressure valve.

20 Claims, 19 Drawing Sheets

(56) References Cited

U.S. PATENT DOCUMENTS

| | | | |
|---|---|---|---|
| 2014/0233156 A1* | 8/2014 | Yasuzaka | H01G 9/12 361/521 |
| 2014/0240900 A1* | 8/2014 | Mori | H01G 9/08 361/521 |
| 2021/0098200 A1* | 4/2021 | Honda | H01G 11/20 |

FOREIGN PATENT DOCUMENTS

| | | | | |
|---|---|---|---|---|
| CN | 103946939 B | * | 2/2017 | H01G 9/12 |
| CN | 104321843 B | * | 3/2018 | H01G 9/12 |
| JP | 2001230161 A | * | 8/2001 | |
| JP | 2006-54299 A | | 2/2006 | |
| JP | 2007035813 A | * | 2/2007 | |
| JP | 2013191842 A | * | 9/2013 | |
| JP | 2013-207031 A | | 10/2013 | |
| JP | 2014127692 A | * | 7/2014 | |
| JP | 2014-209526 A | | 11/2014 | |
| JP | 2016-157769 A | | 9/2016 | |

OTHER PUBLICATIONS

Notification of Transmittal of Translation of the International Preliminary Report on Patentability (Form PCT/IB/338) issued in counterpart International application No. PCT/JP2018/046763 dated Jul. 2, 2020 with Forms PCT/IB/326, PCT/IB/373 and PCT/ISA/237, with English translation. (16 pages).
International Search Report dated Mar. 12, 2019, issued in counterpart International Application No. PCT/JP2018/046763, with English Translation. (5 pages).
Written Opinion of the International Searching Authority (Form PCT/ISA/237) dated Mar. 12, 2019, issued in counterpart International Application No. PCT/JP2018/046763. (5 pages).
Office Action dated Apr. 27, 2021, issued in counterpart CN Application No. 201880079638.5, with English translation. (22 pages).
Office Action dated Mar. 31, 2022, issued in counterpart CN application No. 201880079638.5, with English translation. (10 pages).

\* cited by examiner

A

B

A

B

| OPENING DIAMETER a OF VALVE GUIDE (mm) | φ3 | φ4 | φ5 | φ7 | φ10 (COMPARATIVE EXAMPLE) |
|---|---|---|---|---|---|
| OPERATING PRESSURE (MPa) | 1.0 | 0.77 | 0.60 | 0.45 | 0.31 |

FIG.16

| VALVE GUIDE SHAPE | | | OPERATING PRESSURE (MPa) |
|---|---|---|---|
| a DIMENSION HOLE DIAMETER (mm) | RIB | DEPTH (mm) | |
| 5 | ABSENCE | 3 | 0.6 |
| 5 | PRESENCE | 3 | 0.6 |
| 5 | PRESENCE | 1.5 | 0.6 |

FIG.17

| Valve Guide Shape | | | | GAS PERMEATION AMOUNT (PRESSURE CONDITION: 0.4MPa) [mL/h] |
|---|---|---|---|---|
| a DIMENSION HOLE DIAMETER (mm) | THROUGH-HOLE OF STOPPER WALL | RIB | DEPTH (mm) | |
| 5 | ABSENCE | ABSENCE | 3 | 1.4 |
| 5 | PRESENCE (Φ1×EIGHT THROUGH-HOLES) | ABSENCE | 3 | 3.5 |
| 5 | ABSENCE | PRESENCE | 3 | 4.5 |
| 5 | PRESENCE (Φ1×FIVE THROUGH-HOLES) | PRESENCE | 3 | 7.3 |
| 10 | STOPPER WALL: ABSENCE | ABSENCE | — | POOR (PRESSURE VALVE ACTUATION) |

A

B

C

A

B

SEAL PLATE, CAPACITOR AND METHOD FOR MANUFACTURING SEAL PLATE

TECHNICAL FIELD

The present invention relates to a sealing technique for sealing a capacitor case and adjusting a pressure in the case.

BACKGROUND ART

In an electric storage device such as an electrolytic capacitor, a hydrogen gas etc. are generated by a reaction between a capacitor element and an electrolytic solution sealed in a case, and the internal pressure in the case gradually increases. The capacitor includes a pressure valve for discharging the gas stored inside the case to stabilize the pressure in the case while blocking the electrolytic solution inside the case. This pressure valve is actuated due to breakage when the internal pressure exceeds a pressure resistance capacity of the valve. The actuation of this pressure valve is the end of the life of the capacitor, and the capacitor is broken.

Regarding such a pressure valve of a seal plate, a partially thinned pressure valve may be disposed in a through-hole formed in a seal plate, and a support member supporting the pressure valve in the through-hole may be included (e.g., Patent Literature 1). For an explosion-proof valve, multiple valve bodies different in rate of elongation may be stacked in a through-hole of a seal plate, and a valve body outside a container may be fixed by a fitting (e.g., Patent Literature 2). In an explosion-proof valve including a thinned rupture part in a portion of a flat surface of a membrane part, a flange-shaped retaining engagement part may be disposed at an end of a cylindrical mounting part and engaged with an uneven part of a seal plate (e.g., Patent Literature 3).

CITATION LIST

Patent Literature

Patent Literature 1: Japanese Laid-Open Patent Publication No. 2013-207031
Patent Literature 2: Japanese Laid-Open Patent Publication No. 2006-054299
Patent Literature 3: Japanese Laid-Open Patent Publication No. 2016-157769

SUMMARY OF INVENTION

Technical Problem

The pressure valve of the seal plate is made of a gas-permeable resin material, and a resin thickness of a valve body affects gas permeability. In the pressure valve, a valve body part expands as a pressure rises inside a case due to generation of gas, and this expansion causes a change in the resin thickness, which increases or decreases the gas permeability. Specifically, as the resin becomes thinner, a gas permeation amount more increases. However, as the pressure valve is made thinner, the rigidity of the valve body part becomes lower, and the pressure resistance against the internal pressure in the case decreases, so that the valve body may become unable to withstand an increase in pressure and may be actuated.

If the rigidity is increased by making the pressure valve thicker so as to raise the operating pressure of the pressure valve, a gas discharge amount may be insufficient, and the case etc. may be damaged due to an increase in the internal pressure.

In another technique, a gas permeation area may be increased by making the diameter of the pressure valve larger so as to increase the gas permeation amount; however, this poses a problem that the rigidity of the valve body part decreases due to an increase in size of the disposed pressure valve, which may cause a reduction in the operating pressure.

Such a problem is not disclosed or suggested in Patent Literature 1 to 3, and the configurations disclosed in Patent Literature 1 to 3 cannot solve such a problem.

Therefore, a first object of the present invention is to achieve an increase in gas permeability of a pressure valve and a high operating pressure maintained in the pressure valve.

A second object of the present invention is to control a gas discharge capacity and the operating pressure of the pressure valve.

Solution to Problem

To achieve the objects, an aspect of a seal plate of the present invention is a seal plate that seals an opening part of a capacitor case, and includes: a main body part including a through-hole for discharging a gas in the capacitor case; a pressure valve arranged to cover the through-hole and including a valve body part allowing passage of the gas; a storage part formed in the through-hole to receive the valve body part expanded due to a pressure in the capacitor case; and a stopper that includes an opening part for discharging the gas passing through the valve body part and that comes into contact with the valve body part in the storage part to deform the valve body part.

In the seal plate, the stopper may come into contact with a portion of the valve body part in the storage part to allow the valve body part to expand in multiple stages.

In the seal plate, the stopper may include one or more opening parts as the opening part.

In the seal plate, the opening part may include a first opening part opened to the central side of the storage part and a second opening part located around the first opening part and having a smaller opening diameter than the first opening part.

In the seal plate, the stopper may include a plurality of ribs projected into the storage part for the plurality of ribs to be brought into contact with the expanded valve body part.

In the seal plate, the ribs may be arranged at predetermined intervals along an inner circumferential surface of the through-hole.

In the seal plate, the stopper may be made up of a valve guide arranged inside the through-hole, and the valve guide may include a stopper wall covering a portion of the through-hole and a vertical wall part communicating with the stopper wall and vertically disposed along an inner wall of the through-hole. The vertical wall part may come into contact with a portion of the pressure valve to fixedly support the pressure valve in the through-hole. The storage part may be formed in a portion surrounded by the stopper wall and the vertical wall part.

The seal plate may include a moisture-proof valve disposed in the through-hole on the downstream side in a gas discharge direction relative to the stopper and brought into an open state only when the gas passing through the valve body part is discharged from the through-hole to the outside.

In the seal plate, the moisture-proof valve may be disposed away from the stopper in the through-hole.

The seal plate may further include a discharge part allowing a gas passing through the pressure valve to flow in between the stopper and the moisture-proof valve, regulating a flow of the gas, and allowing the gas to flow toward the moisture-proof valve.

The seal plate may further include a support part having one end side disposed on the stopper and the other end side on which a portion of the moisture-proof valve is placed.

The seal plate may further include a first discharge part vertically disposed on the downstream side in a gas discharge direction relative to the stopper and allowing the gas passing through the first opening part to flow downstream of the through-hole, and a wall part forming a second discharge part allowing the gas passing through the second opening part to flow toward the first discharge part.

To achieve the objects, an aspect of a capacitor of the present invention includes: a capacitor element; a capacitor case storing the capacitor element; and a seal plate sealing the opening part of the capacitor case, wherein the seal plate includes a main body part including a through-hole for discharging a gas in the capacitor case, a pressure valve arranged to cover the through-hole and including a valve body part allowing passage of the gas, a storage part formed in the through-hole to receive the valve body part expanded due to a pressure in the capacitor case, and a stopper that includes an opening part for discharging the gas passing through the valve body part and that comes into contact with the valve body part in the storage part to deform the valve body part.

To achieve the objects, an aspect of a method for manufacturing a seal plate of the present invention is a method for manufacturing a seal plate that seals an opening part of a capacitor case, and includes: forming a main body part including a through-hole for discharging a gas in the capacitor case; disposing, on the through-hole, a pressure valve including a valve body part allowing passage of the gas; and disposing, in the through-hole, a stopper that includes an opening part for discharging the gas passing through the valve body part and that comes into contact with the valve body part to deform the valve body part in a storage part receiving the valve body part expanded due to an internal pressure in the capacitor case.

Advantageous Effects of Invention

According to the present invention, any of the following effects is obtained.

(1) In the storage part formed in the through-hole, the valve body is deformed and expanded to a certain state for reducing the thickness so as to enhance a gas discharge function, so that a gas can efficiently be discharged.

(2) An amount of deformation of the valve body part expanding in the storage part is suppressed to a constant level by the stopper formed in the through-hole, so that the pressure resistance against the internal pressure in the capacitor case is improved, and the operating pressure of the pressure valve can be increased.

(3) The gas discharge function and the operating pressure of the pressure valve can be controlled in accordance with the expansion state of the valve body part by the storage part and the stopper formed in the through-hole.

Other objects, features and advantages of the present invention will become more apparent by reference to the accompanying drawings and embodiments.

BRIEF DESCRIPTION OF DRAWINGS

FIG. 16 is a diagram showing Experimental Example 3.
FIG. 17 is a diagram showing Experimental Example 4.

DESCRIPTION OF EMBODIMENTS

First Embodiment

Figure 1:
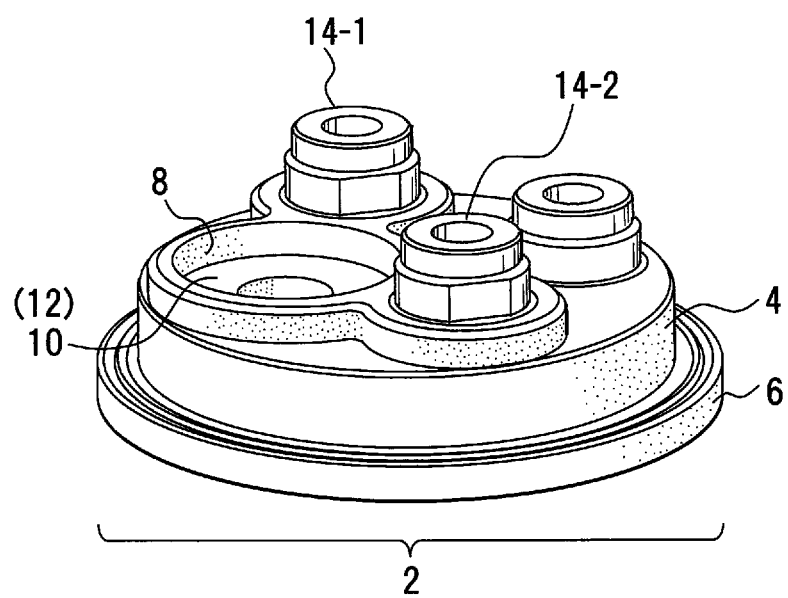
FIG. 1 is a diagram showing an external configuration example of a seal plate according to a first embodiment.

FIG. 1 shows an external configuration example of a seal plate according to a first embodiment. The configuration shown in FIG. 1 is an example, and the present invention is not limited to this configuration.

A seal plate 2 shown in FIG. 1 is an example of means for sealing a capacitor case in which a capacitor element and an electrolytic solution are placed. The seal plate 2 is formed, into, for example, a shape corresponding to an opening shape of a case to be disposed, and for example, when the case is disposed in a circular opening part, the seal plate 2 is formed into a disk shape having the same or a nearly the same diameter. Alternatively, when the opening part of the case has a polygonal shape, the seal plate 2 is formed in conformity with the shape and the size.

The seal plate 2 includes a main body part 4 having a diameter smaller than the opening part of the case, for example, and exposed to the outside of the case at the time of sealing and a flange part 6 arranged on the lower side of the main body part 4 and having a diameter allowing fitting into the opening part of the case.

The seal plate 2 includes a through-hole 8 penetrating a flat plate surface of the main body part 4, for example, and includes a stopper wall 10 closing a portion of an opening diameter and a pressure valve 12 not shown inside the hole.

Anode-side and cathode-side external terminals 14-1, 14-2 are disposed on the main body part 4, and the main body part 4 may be provided with auxiliary terminals and other components. The external terminals 14-1, 14-2 are an example of a connection part to be connected to an electronic device, an apparatus, etc. and are each connected to a cathode part or an anode part of a capacitor element stored in the case.

The through-hole 8 is an example of a gas discharge path allowing passage of a gas generated in the capacitor case and penetrates through front and back flat plate surfaces of the seal plate 2. The through-hole 8 may have a constant inner diameter or may have an inner diameter varying depending on a position of a component etc. disposed in the through-hole 8. Additionally, a locking structure for a component not shown may be included inside the through-hole 8. The through-hole 8 is an example of means connecting the inside of the case to the outside of the capacitor when the opening part of the capacitor case is sealed and thereby discharging a vapor generated inside the case and a gas generated by a chemical reaction of the electrolytic solution to the outside of the case. The stopper wall 10 is an example of a stopper of the present disclosure and is configured to come into contact with and deform the pressure valve 12 expanding inside the through-hole 8. The contact with the stopper wall 10 as described above suppresses the expansion of the pressure valve 12.

<Disposition Structure of Pressure Valve 12 Inside Through-Hole 8>

Figure 2:
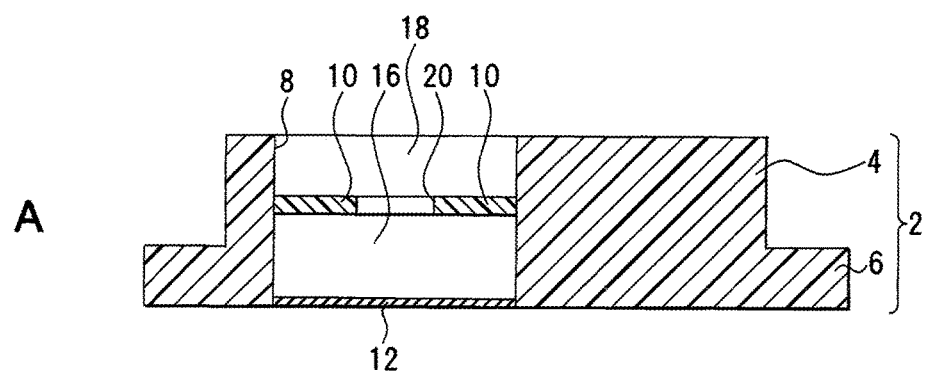
FIG. 2 is a diagram showing an internal configuration example of the seal plate.
Figure 2:
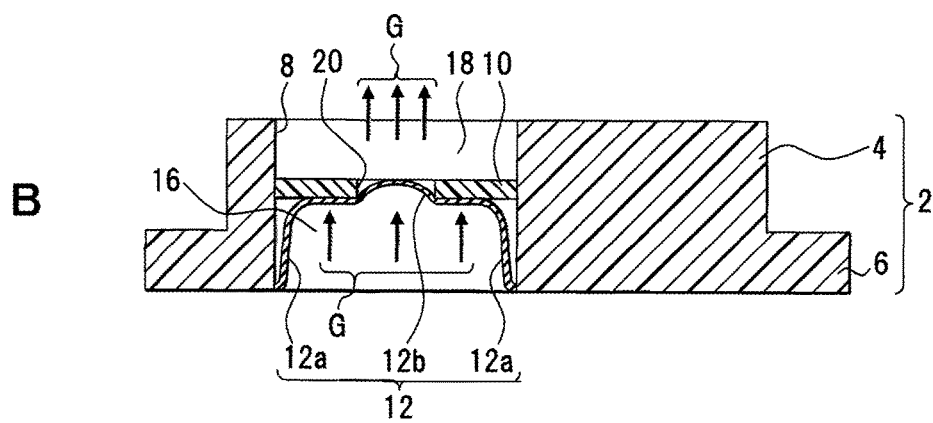

For example, as shown in A of FIG. 2, the through-hole 8 is covered by the pressure valve 12 arranged in an opening part on the flange part 6 side. The pressure valve 12 is an example of means preventing outflow of the electrolytic solution etc. to the through-hole 8 and adjusting an amount of permeation of the gas generated inside the case, may be made of a rubber material such as silicon rubber having elasticity, elastomer, butyl rubber or ethylene propylene rubber, allows passage of a gas G flowing into the through-hole 8 and has elasticity allowing expansion under the pressure of the gas G. The pressure valve 12 is fixed at a set position by adhesive bonding or pressure bonding, or by using connection means not shown, to the flange part 6 or an inner wall of the through-hole 8, for example.

In the through-hole 8, the pressure valve 12 and the stopper wall 10 are separated from each other to form a space having a predetermined length in the flow direction of the gas G. This space in the through-hole 8 is an example of a storage part 16 receiving the pressure valve 12 expanding and deforming when the pressure in the capacitor case not shown increases and the generated gas G flows toward the through-hole 8. For example, as shown in B of FIG. 2, the seal plate 2 discharges the gas G through the through-hole 8 in response to a pressure increase in the capacitor case due to the generation of the gas G. In this case, the pressure valve 12 expanding due to the pressure comes into contact with the inner wall of the through-hole 8 and a wall surface of the stopper wall 10 constituting the storage part 16, for example. The stopper wall 10 includes an opening part 20 having a predetermined diameter or width along a central axis of the through-hole 8, for example. The opening part 20 is an example of a portion allowing the gas G passing through the pressure valve 12 to flow toward a discharge part 18 of the through-hole 8. The opening part 20 allows a portion of the expanded pressure valve 12 to be disposed therein or receives a portion of the pressure valve 12 inside the opening thereof. In this case, a valve body part of the expanded pressure valve 12 is expanded in multiple stages. Specifically, the valve body part is provided with at least a first expanding part 12a expanding along the inner wall of the through-hole 8 and the wall surface of the stopper wall 10 and a second expanding part 12b expanding to enter the opening part 20. A bent portion is formed between the first expanding part 12a and the second expanding part 12b and is pressed due to the contact with the inner wall surface of the through-hole 8 and the wall surface of the stopper wall 10 so that the displacement due to expansion is prevented. In this case, the first expanding part 12a and the second expanding part 12b are made thinner than those before expansion, so that the permeability for the gas G is increased.

In the seal plate 2 with the expanded pressure valve 12, a space for storing the gas generated in the case is formed in accordance with a capacity of the storage part 16. Furthermore, the second expanding part 12b allows passage and discharge of the gas G through the opening part 20 having a smaller diameter than the storage part 16 and thereby can increase the operating pressure at which the valve body part is actuated due to breakage. This is because, for example, the internal pressure in the case acts on the entire valve body part in the storage part 16 rather than acting in a concentrated manner on the second expanding part 12b through which the gas passes.

As described above, the seal plate 2 improves the permeability for the gas G with either or both of the capacity of the storage part 16 and the size of the opening part 20 in the through-hole 8 and enables adjustment of the operating pressure at which the valve body part is broken due to the pressure in the case.

Effects of First Embodiment

According to this configuration, the following effects are obtained.

(1) The valve body part can be deformed and the amount of the expansion thereof can be adjusted by bringing the stopper wall 10 into contact with the expanding portion of the pressure valve 12.

(2) Since the stopper wall 10 maintains the pressure valve 12 in the expanded state in the storage part 16, the gas permeability is improved due to thinning of the valve body part, and a gas releasing function of the seal plate 2 is enhanced.

(3) The thickness of the expanded pressure valve 12 can be set depending on the capacity of the storage part 16, so that the gas permeability of the seal plate 2 can be adjusted.

(4) A gas permeation area of the valve body part is adjusted with the size of the opening part 20 formed in the stopper wall 10, and the operating pressure of the valve body part is increased by making the diameter of the opening part 20 smaller.

(5) By forming the opening part 20 having a diameter smaller than the storage part 16 in the stopper wall 10, the flow speed of the gas is increased in the opening part 20, so that the gas discharge efficiency can be improved.

Second Embodiment

Figure 3:
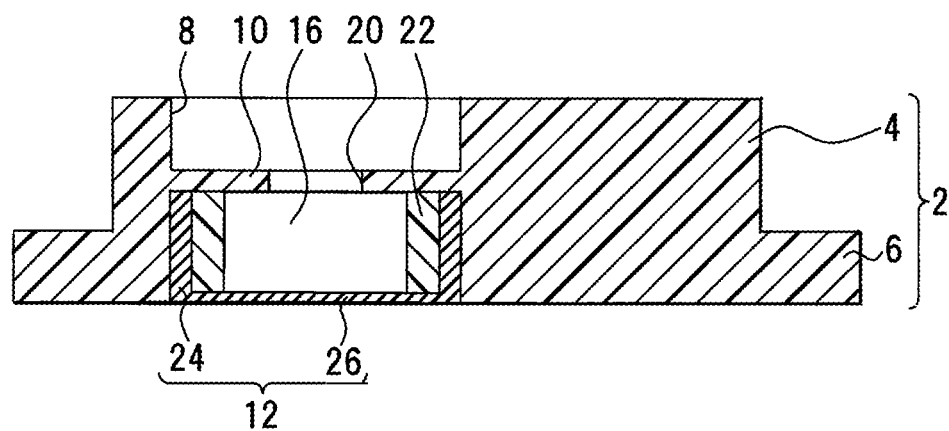
FIG. 3 is a diagram showing a configuration example of a seal plate according to a second embodiment.
Figure 3:
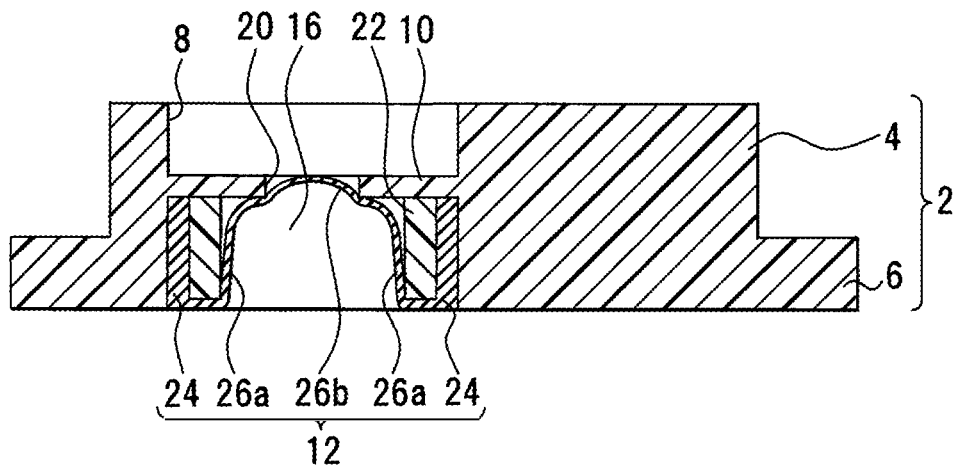

FIG. 3 shows a configuration example of a seal plate according to a second embodiment. In FIG. 3, the same portions as those of FIGS. 1 and 2 are denoted by the same reference signs.

For example, as shown in A of FIG. 3, the seal plate 2 has the stopper wall 10 formed integrally with the main body part 4 in the through-hole 8, and the stopper wall 10 is brought into contact with the expanded pressure valve 12. The stopper wall 10 may be formed, for example, in a formation process of the through-hole 8, by processing such as cutting from both sides of the main body part 4 and the flange part 6 to a certain depth such that a predetermined thickness is left in an intermediate portion of the through-hole 8. The stopper wall 10 may be provided with the opening part 20 having a predetermined diameter or size based on, for example, the central axis of the through-hole 8 or an independent reference axis and having a smaller diameter than the through-hole 8. As a result, the through-hole 8 includes the stopper wall 10 having predetermined width and thickness along the inner wall and the opening part 20 allowing passage of the gas G.

The seal plate 2 also includes a vertical wall part 22 supporting the pressure valve 12 inside the through-hole 8. The vertical wall part 22 is disposed on the opening side of the through-hole 8 partitioned by the stopper wall 10, and the opening takes in the gas G from the capacitor case. The vertical wall part 22 has, for example, a predetermined length along the flow direction of the gas G in the through-hole 8, includes a cylindrical wall surface having a continuous or intermittent wall surface along an inner circumferential surface of the through-hole 8 and has at least one end side arranged in contact with the wall surface of the stopper wall 10. The vertical wall part 22 has a width smaller than the length of the wall surface of the stopper wall 10 brought into contact with the pressure valve 12 and is disposed at a position where the opening part 20 of the stopper wall 10 is not blocked. A side surface part 24 of the pressure valve 12 is sandwiched between the wall surface of the vertical wall part 22 and the wall surface of the through-hole 8. As a result, a space inside the vertical wall part 22 having a diameter larger than that of the opening part 20 is formed in the through-hole 8 as the storage part 16 receiving the pressure valve 12.

The pressure valve 12 includes, for example, the side surface part 24 in contact with the inner wall of the through-hole 8 and a valve body part 26 covering the opening part of the through-hole 8 and is formed into a bottomed cylindrical shape having an outer diameter equal to that of the through-hole 8 and opened on one end side. In the pressure valve 12, the thickness of the valve body part 26 may be thinner than or equal to the thickness of the side surface part 24. The side surface part 24 and the valve body part 26 may be made of the same material and, for example, a rubber material such as silicon rubber having elasticity, elastomer, butyl rubber or ethylene propylene rubber may be used. If the side surface part 24 and the valve body part 26 are made of different materials, at least the valve body part 26 may be made of the rubber material having elasticity.

When the capacitor starts being used and the internal pressure of the case increases, the generated gas G flows toward the through-hole 8, so that the valve body part 26 of the pressure valve 12 is subjected to the pressure and expands. For example, as shown in B of FIG. 3, an expanding portion of the valve body part 26 reaches the stopper wall 10 and further comes into contact with an edge portion of the opening part 20. A portion of the valve body part 26 coming into contact with the edge portion of the opening part 20 further enters the inside of the opening part 20 to expand. In this way, the valve body part 26 expands in multiple stages. The valve body part 26 is provided with a first expanding part 26a displaced while expanding along the inner wall surface of the vertical wall part 22 or the stopper wall 10, for example, and a second expanding part 26b entering the opening part 20 to reach the through-hole 8 or displaced to a position facing the through-hole 8. A bent portion is formed between the first expanding part 26a and the second expanding part 26b and is pressed due to the contact with the inner wall surface of the vertical wall part 22 or the stopper wall 10 so that the displacement due to expansion is prevented. The state of the force acting on the valve body part 26 and the state of the valve body part 26 at the time of the expansion are the same as the states of the pressure valve 12 described in the first embodiment.

Effects of Second Embodiment

According to this configuration, the following effects are obtained.

(1) The amount of expansion of the valve body part 26 can be adjusted by bringing the stopper wall 10 into contact with the expanding portion of the pressure valve 12.

(2) Since the stopper wall 10 maintains the valve body part 26 in the expanded state in the storage part 16, the gas permeability is improved due to thinning of the valve body part 26, and the gas discharge function of the seal plate 2 is enhanced.

(3) The contact with the inner wall side of the vertical wall part 22 enhances the fixed support of the pressure valve 12 with respect to the through-hole 8.

(4) The contact area between the vertical wall part 22 and the side surface part 24 of the pressure valve 12 and the contact area with the inner wall surface of the through-hole 8 can be made wider, so that the fixed support of the pressure valve 12 is improved, and the sealing property of the through-hole 8 can be improved.

(5) The thickness of the valve body part 26 can be set depending on the capacity of the storage part 16, so that the gas permeability of the seal plate 2 can be adjusted.

(6) The gas permeation area of the valve body part 26 is adjusted with the size of the opening part 20, and the operating pressure of the valve body part 26 is increased by making the diameter of the opening part 20 smaller.

(7) In the seal plate 2, the opening part 20 having a diameter smaller than that of the storage part 16 is formed by the stopper wall 10, and therefore, the flow speed of the gas is increased in the opening part 20, so that the gas discharge efficiency can be improved.

Third Embodiment

Figure 4:
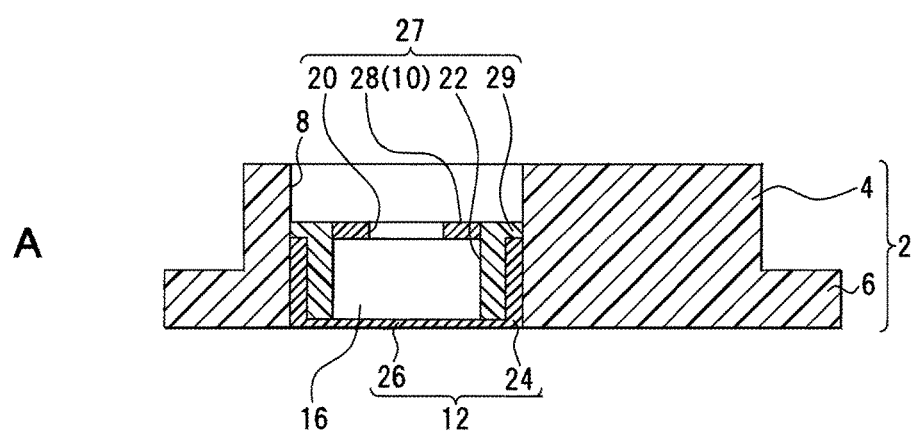
FIG. 4 is a diagram showing a configuration example of a seal plate according to a third embodiment.
Figure 4:
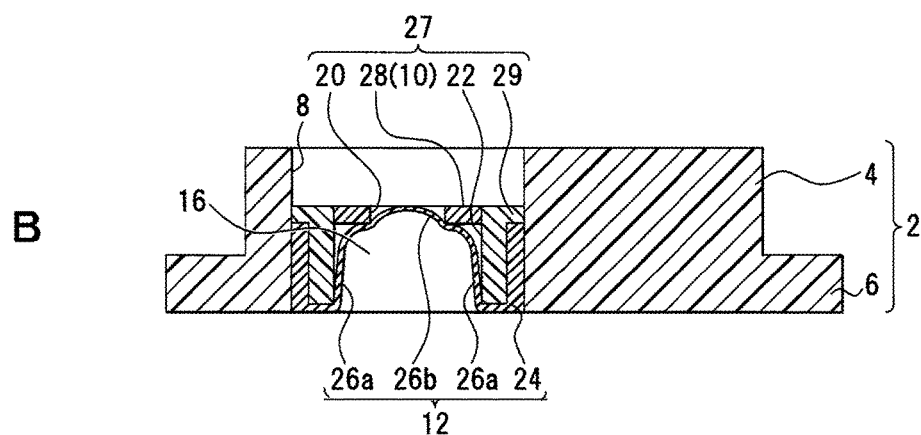

FIG. 4 shows a configuration example of a seal plate according to a third embodiment. In FIG. 4, the same portions as those of FIGS. 1 and 2 or FIG. 3 are denoted by the same reference signs.

For example, as shown in A of FIG. 4, the seal plate 2 includes a valve guide 27 inside the through-hole 8, and the valve guide 27 has a stopper function and a function of the vertical wall part 22 fixedly supporting the side surface part 24 of the pressure valve 12. The valve guide 27 is a cylindrical body having a space portion on the center side, includes a flange part 29 having a diameter equal to that of the through-hole 8 in a portion arranged on the center side of the through-hole 8, and includes a stopper wall 28 protruding toward the central axis of the through-hole 8 inside the flange part 29. The vertical wall part 22 is integrally formed with the flange part 29 and is along the inner wall surface of the through-hole 8 toward the case. The valve guide 27 is provided with the stopper wall 28 having a length not reaching the central axis side of the through-hole 8, for example, and includes the opening part 20 allowing passage of the gas G. For example, the stopper wall 28, the flange part 29 and the vertical wall part 22 of the valve guide 27 may be formed as the same member made of a resin material such as polyphenylene sulfide (PPS) or polypropylene (PP), or these constituent elements may be made of respective different materials and integrated.

When the capacitor starts being used and the internal pressure of the case increases, the valve body part 26 of the pressure valve 12 is expanded as shown in B of FIG. 4, for example, and the expanding part 26a reaches the stopper wall 28 and further comes into contact with an edge portion of the opening part 20. The expanding part 26b coming into contact with the edge portion of the opening part 20 further enters the inside of the opening part 20 to expand.

Effects of Third Embodiment

According to this configuration, the following effects are obtained.

(1) The valve guide 27 can adjust the amount of expansion of the valve body part 26 by bringing the stopper wall 28 into contact with the expanding portion of the pressure valve 12.

(2) Since the stopper wall 28 of the valve guide 27 maintains the pressure valve 12 in the expanded state in the storage part 16, the gas permeability is improved due to thinning of the valve body part 26, and the gas discharge function of the seal plate 2 is enhanced.

(3) The vertical wall part 22 of the valve guide 27 is brought into contact with the inner wall side of the pressure valve 12, so that the fixed support of the pressure valve 12 is enhanced with respect to the through-hole 8.

Fourth Embodiment

Figure 5:
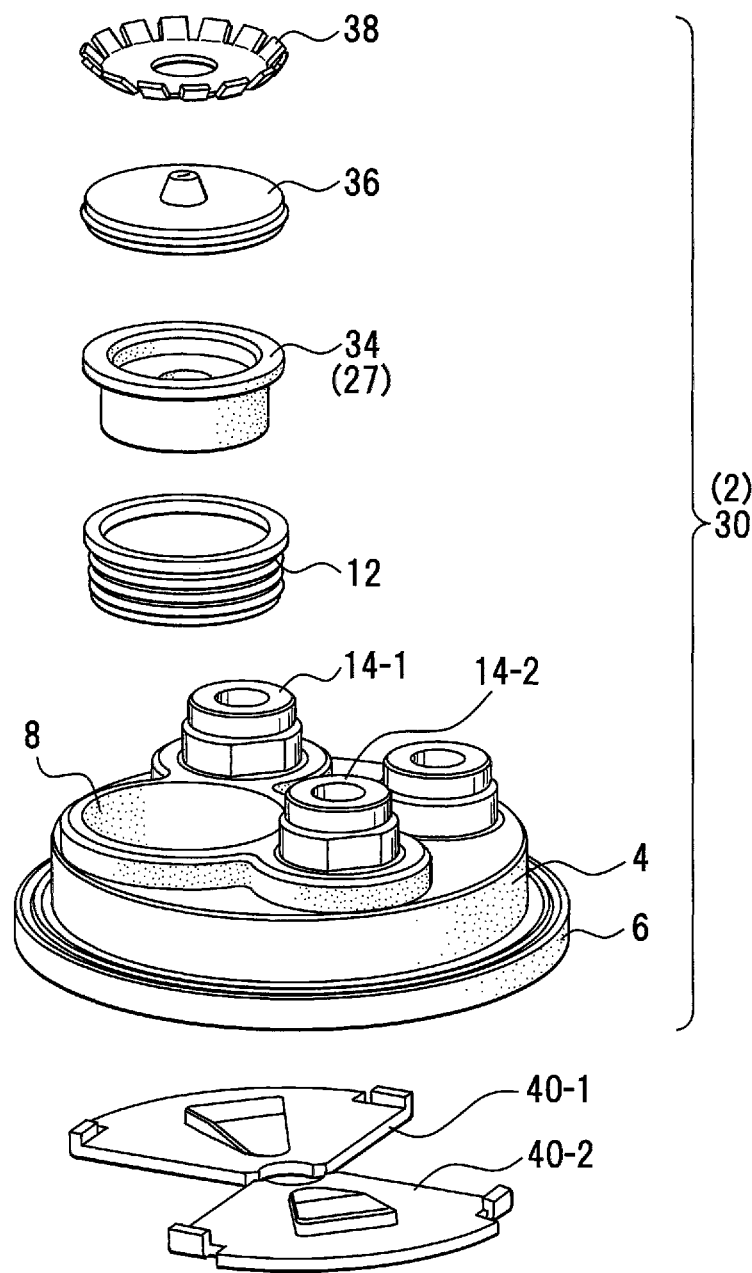
FIG. 5 is an assembly diagram showing a configuration example of a seal plate according to a fourth embodiment.

FIG. 5 shows a configuration example of a seal plate according to a fourth embodiment. The configuration shown in FIG. 5 is an example, and the present invention is not limited to this configuration. In FIG. 5, the same portions as those of FIGS. 1 to 4 are denoted by the same reference signs.

A seal plate 30 shown in FIG. 5 has the cylindrical pressure valve 12 inserted into the through-hole 8 formed in the main body part 4, for example, and has a valve guide 34 that is formed to be capable of being partially or entirely fitted into an opening portion of the pressure valve 12 and is disposed on the opening portion of the pressure valve 12. Additionally, in the through-hole 8, for example, a washer 38 is disposed on or above a moisture-proof valve 36 lying on or above the valve guide 34.

The moisture-proof valve 36 is an example of backflow preventing means for the gas discharge function of the seal plate 30 and, for example, a duckbill type valve is used. The moisture-proof valve 36 has a configuration in which a valve body is opened by a pressure from the case side to discharge a gas and the valve body is closed except when the gas is discharged, so that the entry of air, moisture, etc. from the outside of the case is prevented.

The washer 38 is an example of means for fixedly supporting, in the through-hole 8, the pressure valve 12, the valve guide 34, the moisture-proof valve 36, etc. disposed in the through-hole 8 and includes an opening part allowing the valve body part of the moisture-proof valve 36 to penetrate and a locking piece locked to the inner wall of the through-hole 8 with pressure along an outer circumference portion.

Figure 6:
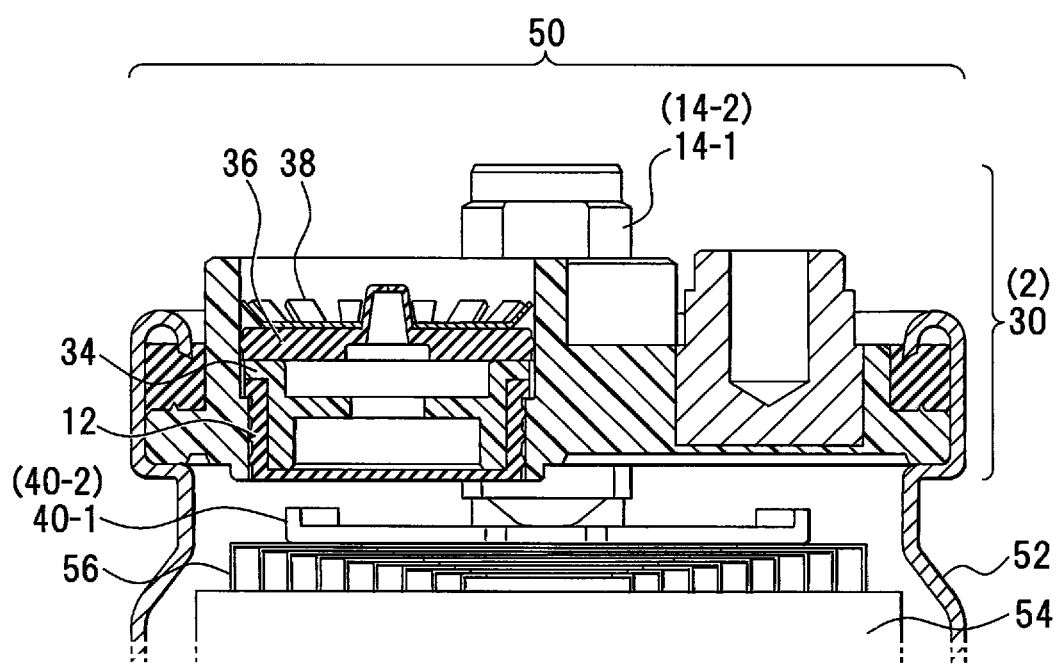
FIG. 6 is a diagram showing a configuration example of a capacitor.

In the seal plate 30, portions of the external terminals 14-1, 14-2 penetrating to the inner surface side toward the case come into contact with portions of current collector plates 40-1, 40-2. In the capacitor 50 provided with the seal plate 30, for example, as shown in FIG. 6, an electrolytic solution etc. are sealed together with a capacitor element 54 inside an exterior case 52. One end side of the current collector plates 40-1, 40-2 is connected to a tab 56 of each electrode of the capacitor element 54, the other end side of the current collector plates 40-1, 40-2 is connected to terminal parts of the external terminals 14-1, 14-2 penetrating the seal plate 30, and the current collector plates 40-1, 40-2 are thereby brought into an electrically connected state.

The exterior case 52 is an example of a capacitor case of the present disclosure and is formed into a bottomed cylindrical shape opened on one end side where the seal plate 30 is disposed, for example. The exterior case 52 is made of a metal material such as aluminum, for example. On the opening part side of the exterior case 52, the opening part is crimped and narrowed in accordance with a position on the one end side of the seal plate 30 located inside the storage part or a position of a side surface portion of the seal plate 30, so that the seal plate 30 is fixed. A leading end side of the opening part of the exterior case 52 is rolled inside the opening part and is brought into contact with or press-fitted to the upper surface side of the seal plate 30.

The pressure valve 12 arranged in the through-hole 8 is fixedly supported in a stacked state by the valve guide 34, the moisture-proof valve 36, the washer 38, etc. In this case, the valve body part 26 of the pressure valve 12 may be arranged flush with a bottom surface of the seal plate 30 or may be arranged such that the seal plate 30 protrudes by a predetermined amount on the end surface side.

<Configuration of Valve Guide 34>

Figure 7:
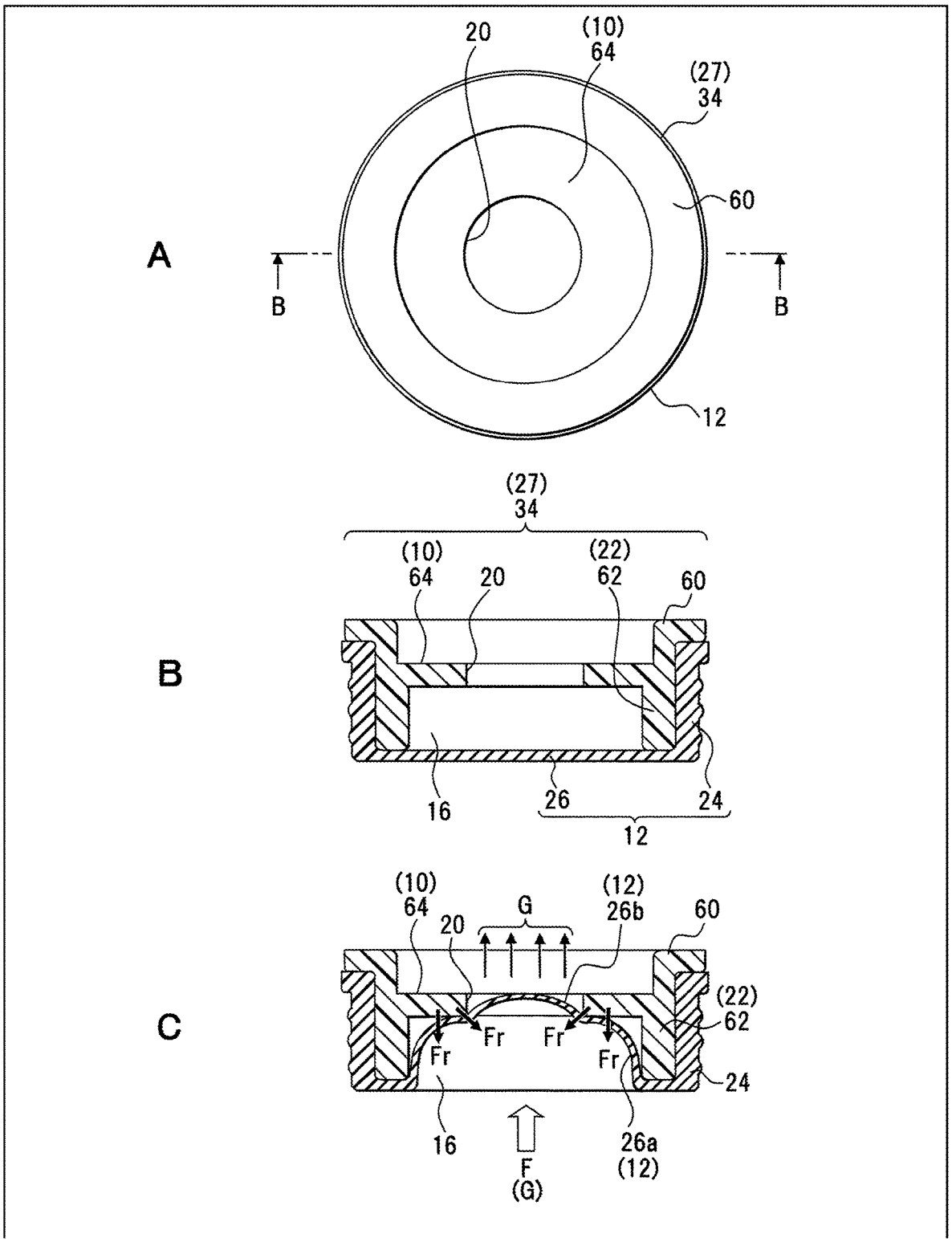
FIG. 7 is a diagram showing an internal configuration example of a seal plate.

For example, as shown in A of FIG. 7, the valve guide 34 is formed into a circular shape having an outer diameter smaller than the inner diameter of the through-hole 8. The valve guide 34 includes, in an outer circumferential portion on the end surface side, a flange part 60 engaged with a locking part inside the through-hole 8 not shown and includes a stopper wall 64 projected toward the center of the valve guide 34 to prevent the pressure valve 12 from expanding. The opening part 20 allowing passage of the gas has an opening area determined by a projection length of the stopper wall 64.

In the valve guide 34, as shown in B of FIG. 7, an outer circumferential portion of a vertical wall part 62 formed integrally with the flange part 60 is surrounded by the pressure valve 12. Therefore, the valve guide 34 is inserted inside the bottomed cylindrical pressure valve 12. The pressure valve 12 may have multiple protrusions formed on the outer circumferential side of the side surface part 24, for example.

When an internal pressure F(G) is generated by a gas etc. generated in the exterior case 52, the valve body part 26 arranged at a position covering the storage part 16 of the valve guide 34 expands in the direction of the pressure as shown in C of FIG. 7, for example, in the pressure valve 12. In this case, the first expanding part 26a of the pressure valve 12 extends while being subjected to a predetermined contact pressure Fr from the vertical wall part 62 and the stopper wall 64. The first expanding part 26a is maintained by the contact pressure Fr in a state where the first expanding part 26a can no longer expand, so that the valve body part is kept unbroken even through the thickness of the valve body part changes. Additionally, the second expanding part 26b reaching the opening part 20 side of the valve guide 34 is subjected to the contact pressure Fr in the central axis direction of the storage part 16 and the opening part 20 from a circumferential edge of the opening part 20 and is thereby prevented from excessively expanding into the opening part 20. As a result, the second expanding part 26b expands to a predetermined size in the opening part 20, for example, and is thereby maintained in a thinned state, so that the permeation amount of the gas G is increased while the breakage of the valve body part 26 due to expansion is avoided.

<Manufacturing Process of Seal Plate 30>

This manufacturing process of the seal plate 30 is an example of a method for manufacturing a seal plate of the present disclosure and includes, for example, the following steps:

(1) a step of arranging the pressure valve 12 in the through-hole 8 of the seal plate 30;

(2) a step of inserting the valve guide 34 into the through-hole 8 such that the storage part 16 of the valve guide 34 is arranged inside the opening portion of the pressure valve 12; and (3) other steps of disposing the moisture-proof valve 36 and the washer 38.

Effects of Fourth Embodiment

According to this configuration, the following effects can be expected in addition to the effects of the embodiments described above.

(1) The pressure valve 12 is subjected to the contact pressure from the inner wall of the valve guide 34 and the stopper wall 64 and is therefore reduced in displacement amount. Since a predetermined thickness state is maintained, the gas permeability is enhanced and the operating pressure of the pressure valve can be increased.

(2) By increasing the operating pressure of the pressure valve 12, a gas pressure regulation function is improved, so that a pressure rise in the capacitor case can be suppressed to extend the life of the capacitor 50.

Fifth Embodiment

Figure 8:
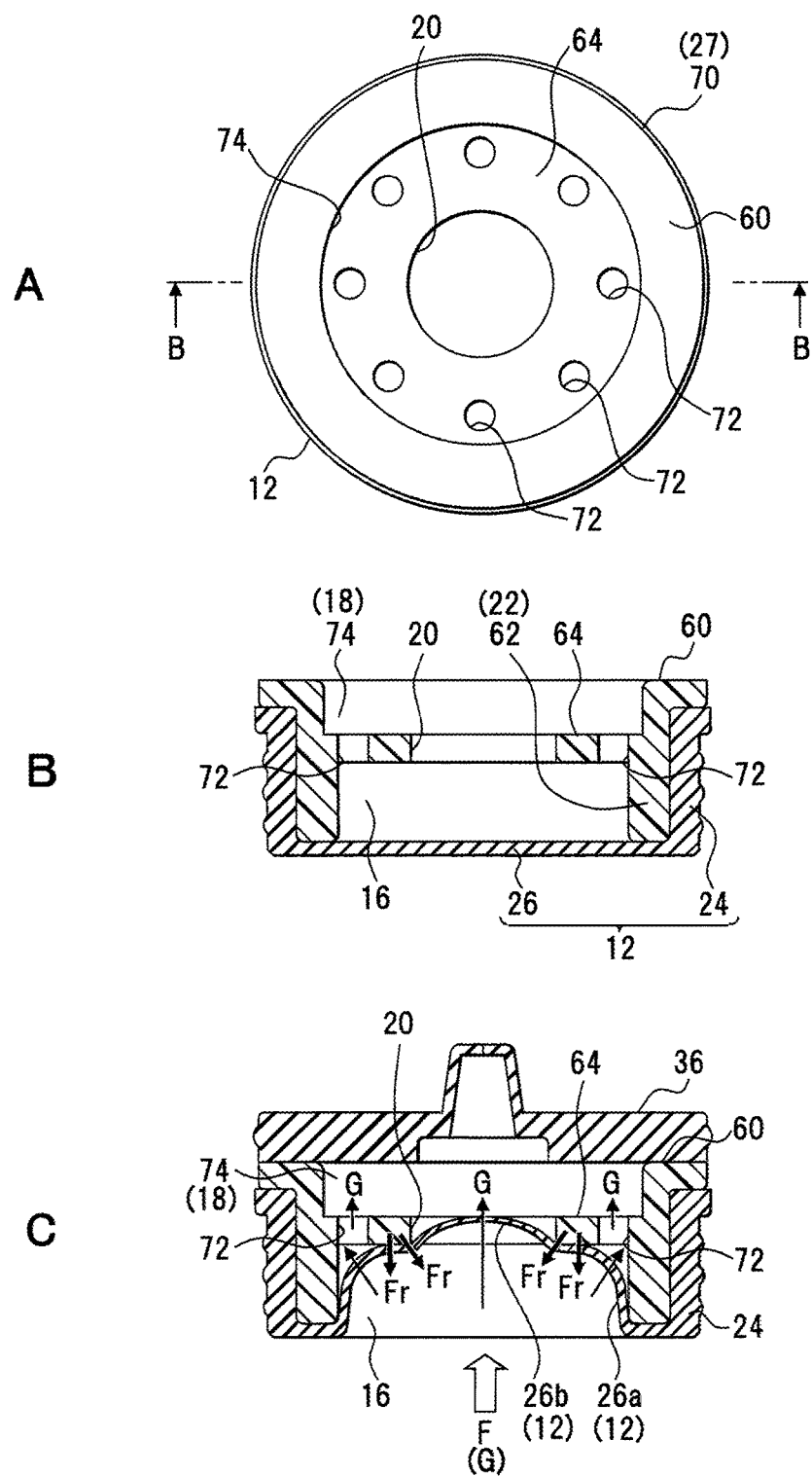
FIG. 8 is a diagram showing a configuration example of a valve guide of a seal plate according to a fifth embodiment.

FIG. 8 shows a configuration example of a valve guide of a seal plate according to a fifth embodiment. In FIG. 8, the same constituent elements as those of FIGS. 2 to 7 are denoted by the same reference signs.

For example, as shown in A of FIG. 8, the valve guide 70 has multiple through-holes 72 in a portion of the stopper wall 64 preventing the displacement of the pressure valve 12 due to expansion in the storage part 16. The through-holes 72 are formed around the opening part 20, which is formed by the stopper wall 64, at predetermined intervals in the circumferential edge thereof, for example. The through-holes 72 have the same diameter as or a smaller diameter than the opening part 20.

For example, as shown in B of FIG. 8, the through-holes 72 are formed on the outer circumferential side of the stopper wall 64 and along the end surface of the vertical wall part 62. Specifically, the through-holes 72 are preferably formed along the outer circumferential surface of the storage part 16. The through-holes 72 are an example of an opening part of the present disclosure discharging a gas from the storage part 16 together with the opening part 20, are formed in a terminal end outer edge portion of the storage part 16 in the gas discharge direction, and therefore have a configuration eliminating the contact, or reducing an amount of contact, with the expanded valve body part 26. Due to such a configuration, the valve guide 70 includes the large-diameter opening part 20 formed at the central axis of the through-hole 8 as a first opening part discharging the gas and the through-holes 72 serving as a second opening part formed therearound.

Furthermore, the valve guide 70 has a discharge part 74 formed in a space portion that is inside the flange part 60 and that separates a discharge-side surface of the stopper wall 64 and the moisture-proof valve 36 placed on the flange part 60. The discharge part 74 is a portion of the valve guide 70 from which the gas passing through the opening part 20 and the through-holes 72 from the valve body part 26 is discharged, for example, and is formed coaxially with the through-hole 8 or the opening central axis of the opening part 20. The discharge part 74 has a diameter equal to or greater than that of the storage part 16 and has a diameter allowing communication between the opening part 20 and the through-holes 72.

The depth of the discharge part 74 from the end surface of the valve guide 70 on the flange part 60 side, i.e., the capacity allowing the discharged gas G to stay, is determined depending on a formation position of the stopper wall 64. The depth of the discharge part 74, i.e., the formation position of the stopper wall 64 from the end surface on the flame part 60 side, is set to a value larger than the thickness of the flange part 60, for example. As a result, the gas G passing through the opening part 20 and the through-holes 72 flows into the discharge part 74.

For example, as shown in C of FIG. 8, when the valve body part 26 is subjected to the internal pressure of the case attributable to the generation of the gas G etc., the first expanding part 26a is displaced along the vertical wall part 62 so that a portion thereof comes into contact with the inside of the stopper wall 64. In this case, in the storage part 16, a minute gap is formed in a corner portion between the vertical wall part 62 and the stopper wall 64, for example, from the valve body part 26 expanded into a curved shape. The gas flowing in from the exterior case passes through the thinned first expanding part 26a and also flows toward the gap formed by the valve body part 26 and the stopper wall 64.

Therefore, the valve guide 70 is provided with the through-holes 72, which is for allowing the gas to flow, in a portion of the stopper wall 64 adjacent to this gap, so that the gas passing through the first expanding part 26a is also discharged. As a result, the valve guide 70 increases the flow paths for allowing the gas passing through the pressure valve 12 expanded in the storage part 16 to pass through the stopper wall 64.

The discharge part 74 is closed by the moisture-proof valve 36 disposed in the through-hole 8. The gas G passing through the pressure valve 12 due to the increase of the internal pressure in the case flows through the opening part 20 or the through-holes 72 into the discharge part 74 and is then regulated in the discharge part 74 before flowing toward a discharge opening part.

Although the gap is formed between the vertical wall part 62, the stopper wall 64 and the expanded valve body part 26 in the storage part 16 in the description, the present invention is not limited thereto. The valve body part 26 may come into close contact with the vertical wall part 62 and the stopper wall 64 depending on a magnitude of the internal pressure in the exterior case, and no gap may be formed. Even in this case, by forming the through-holes 72 on the outer circumferential side of the stopper wall 64, the flow path area can be increased for the gas passing through the stopper wall 64. When the valve body part 26 comes into close contact with the stopper wall 64, a portion of the first expanding part 26a may enter the through-holes 72 and the gas may be discharged from this portion through the through-holes 72.

Effects of Fifth Embodiment

According to this configuration, the following effects can be expected in addition to the effects of the first and second embodiments described above.

(1) Since the gas discharge area can be increased by disposing the through-holes 72, the gas discharge efficiency relative to the capacity of the storage part 16 can be increased. This increase in the discharge efficiency leads to suppression of an increase in the internal pressure of the capacitor, resulting in improved safety.

(2) By disposing the through-holes 72 in a portion of the stopper wall 64, the displacement of the pressure valve 12 due to expansion can be suppressed to achieve an improvement in the gas discharge amount and an improvement in the operating pressure of the pressure valve 12 while maintaining the thinned valve body part 26.

(3) The opening area of the gas discharge flow path of the stopper wall 64 is determined depending on the opening diameter of the through-holes 72, so that the gas discharge function can be adjusted in accordance with the capacitor.

(4) By making the opening diameter of the through-holes 72 smaller than that of the opening part 20 to prevent the valve body part 26 from entering the inside of the through-holes 72 or to reduce an amount of contact, the influence of the contact pressure Fr from the through-holes 72 to the valve body part 26 can be suppressed, and the strength of the valve body part 26 can be maintained.

(5) Since the valve guide 70 includes the discharge part 74 into which the gas G passing through the opening part 20 or the through-holes 72 of the stopper wall 64 flows, the gas G discharged from the expansion surface of the pressure valve 12 can be regulated to prevent the pressure from concentrating on a portion of the moisture-proof valve 36.

(6) Since the discharge part 74 is included in the valve guide 70, the opening part 20 and the through-holes 72 can be prevented from being closed due to the contact between the stopper wall 64 and the moisture-proof valve 36.

Sixth Embodiment

Figure 9:
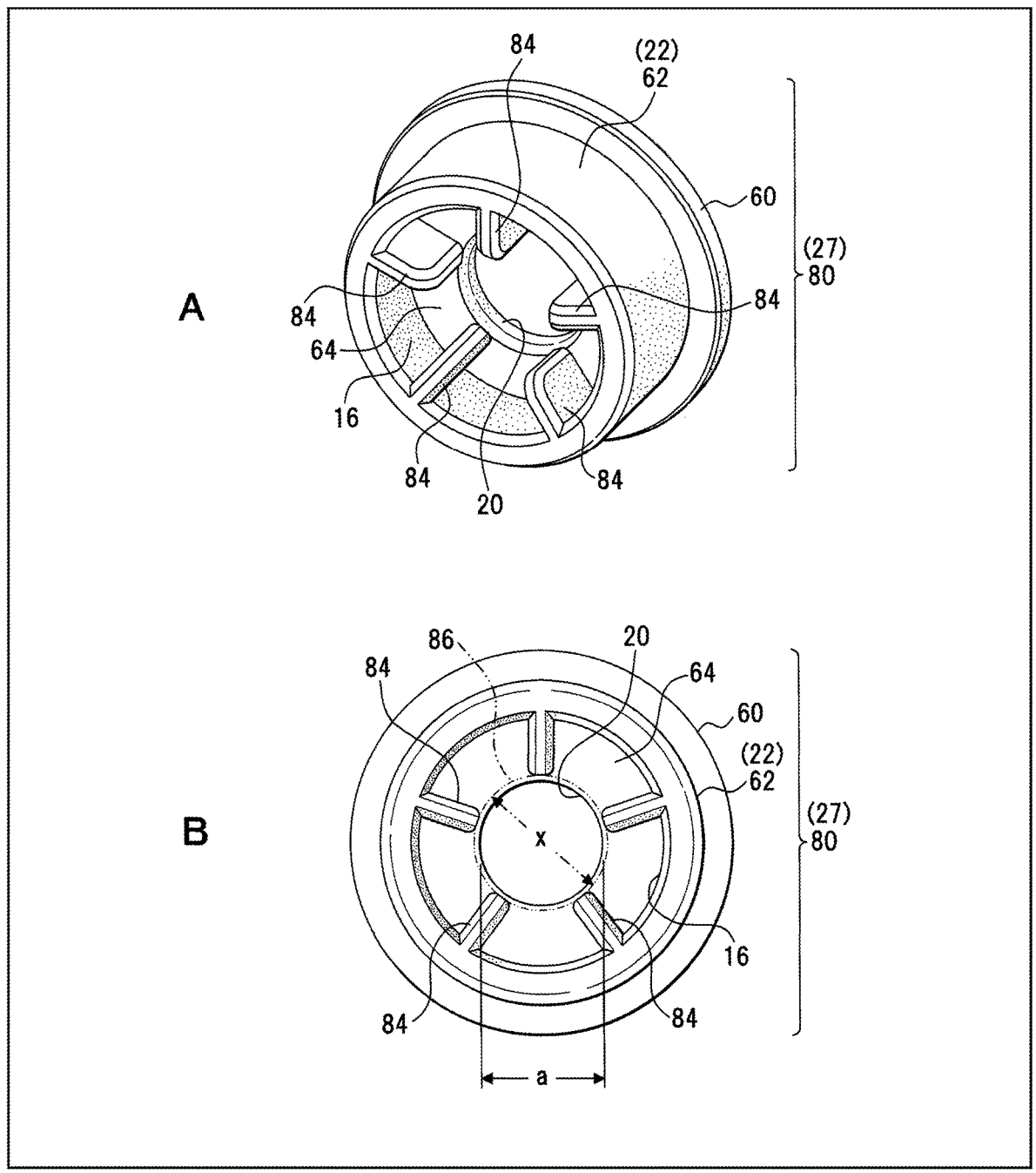
FIG. 9 is a diagram showing a configuration example of a valve guide of a seal plate according to a sixth embodiment.

FIG. 9 shows a configuration example of a valve guide of a seal plate according to a sixth embodiment. In FIG. 9, the same constituent elements as those of FIGS. 2, 7 and 8 are denoted by the same reference signs.

For example, as shown in A of FIG. 9, this valve guide 80 includes a large-diameter flange part 60 on one end side of the vertical wall part 62 formed into a cylindrical shape, the storage part 16 is formed in the valve guide 80, and the valve guide 80 includes the stopper wall 64 forming the opening part 20 narrowing the inner diameter of the storage part 16. In the storage part 16 of the valve guide 80, multiple ribs 84 having a predetermined width are formed on the inner wall of the vertical wall part 62 and the wall surface of the stopper wall 64, for example. The ribs 84 have a predetermined width and are projected toward the center of the storage part 16 from the inner wall surface of the vertical wall part 62, for example. The length of the rib 84 is made equal to the height of the storage part 16 along the flow direction of the gas. The ribs 84 may be arranged at predetermined intervals around the central axis of the storage part 16, for example.

Furthermore, the projection length of the ribs 84 may be made equal to the width of the stopper wall 64, for example. Therefore, a diameter X of a virtual opening space 86 formed with a line connected to tip portions of the ribs 84 in the storage part 16 may be made equal to a diameter a of the opening part 20 formed by the stopper wall 64, for example, as shown in B of FIG. 9.

These ribs 84 are an example of a stopper of the present disclosure and are brought into contact with, for example, the valve body part 26 of the expanded pressure valve 12 in the storage part 16 to suppress displacement due to expansion and maintain a predetermined expanded shape. Therefore, the ribs 84 have a predetermined width so as not to damage the valve body part 26 thinned by expansion, for example, and may have the spherical or tapered tip portions that come into contact with the valve body part 26. The ribs 84 have a width for preventing damage to the valve body part 26 and are narrowed so as not to excessively prevent the expansion of the valve body part 26 in the storage part 16. Therefore, in the valve guide 80, for example, after the total area of the ribs 84 is set within a predetermined range relative to the area of the inner wall surface of the stopper wall 64, the width of each of the ribs 84, the number of the ribs 84, etc. may then be set.

<Contact State of Ribs 84 and Valve Body Part 26>

Figure 10:
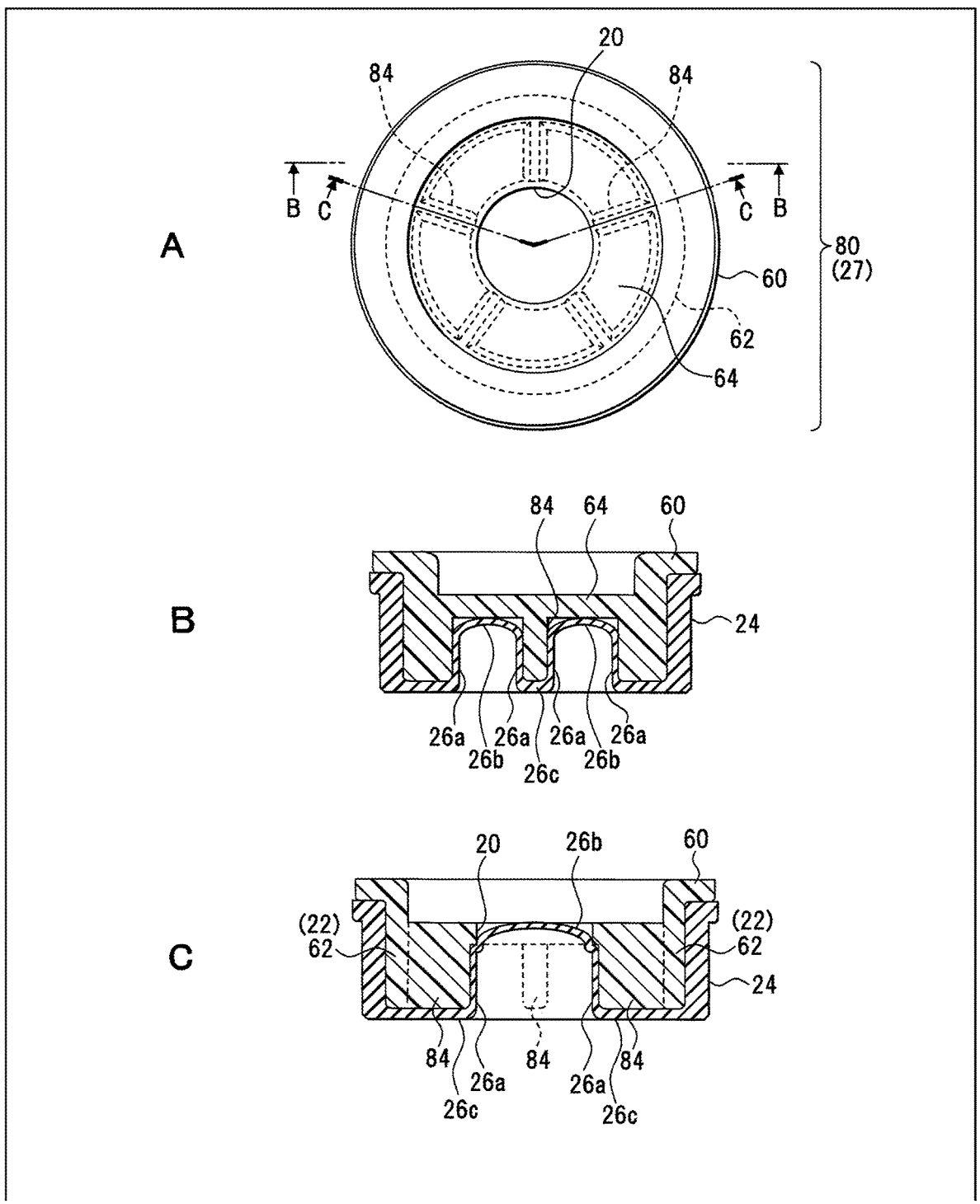
FIG. 10 is a diagram showing a contact state example of a rib and a valve body part.

For example, as shown in A of FIG. 10, the valve guide 80 has the five ribs 84 arranged at equal intervals in the storage part 16. In this case, the pressure valve 12 is subjected to and expanded by the internal pressure in the capacitor case and enters the inside of the storage part 16 from the end surface side of the valve guide 80.

Inside the storage part 16, for example, as shown in B of FIG. 10, at a position not facing the opening part 20, the first expanding part 26a of the valve body part 26 extends along the side surfaces of the vertical wall part 62 and the ribs 84, while the second expanding part 26b comes into contact with the stopper wall 64 so that the displacement due to the expansion is prevented. Additionally, in the valve body part 26, a third expanding part 26c comes into contact with the tip portions of the ribs 84 facing the gas flow direction of the storage part 16 so that the displacement due to the expansion is prevented. Such extension of the valve body part 26 occurs at circumferential edge portions of the ribs 84, and the circumferential edge portions of the ribs 84 do not face the opening part 20.

In a portion of the storage part 16 facing the opening part 20, for example, as shown in C of FIG. 10, the third expanding part 26c extends along the tip portions of the ribs 84, and the first expanding part 26a comes into contact with side surface portions of the ribs 84 along the gas flow direction. The valve body part 26 reaching the opening part 20 enters the inside of the opening part 20 and serves as the thinnest second expanding part 26b to allow passage of the gas.

The valve guide 80 may have the through-holes 72, which allow passage of the gas, formed in a portion of the wall surface of the stopper wall 64, for example.

Effects of Sixth Embodiment

According to this configuration, the following effects can be expected in addition to the effects of the embodiments described above.

(1) Since the multiple ribs 84 are disposed as stoppers in the storage part 16, the contact area of the expanded valve body part 26 can be increased, so that the valve body part 26 can be made thinner to increase the gas permeation amount.

(2) Since the area of contact with the valve body part 26 is increased by the ribs 84, a function of maintaining the shape of the expanding valve body part 26 is improved, and the amount of deformation of the expanding valve body part 26 can be suppressed, so that the operating pressure of the valve body part 26 can be improved.

(3) Since the ribs 84 are brought into contact with a wide portion of the entire valve body part 26 to suppress the displacement due to expansion, an excessive contact pressure is not applied to a portion of the valve body part 26, so that the possibility of breakage of the valve body part 26 can be reduced.

(4) The expansion of the valve body part 26 can be adjusted by the width and length of the rib 84, and the gas discharge function and the operating pressure of the pressure valve can be adjusted in accordance with the characteristics of the capacitor, so that convenience is enhanced.

Seventh Embodiment

Figure 11:
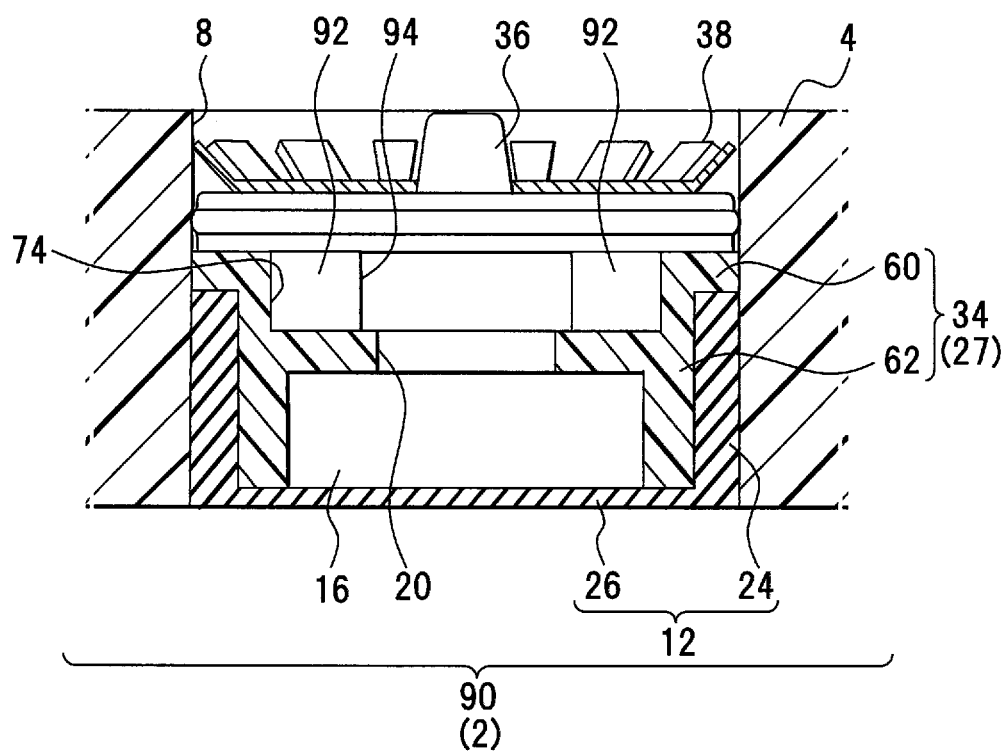
FIG. 11 is a diagram showing a configuration example of a valve guide of a seal plate according to a seventh embodiment.

FIG. 11 shows a configuration example of a valve guide of a seal plate according to a seventh embodiment. In FIG. 11, the same constituent elements as those of FIGS. 2, 9, etc. are denoted by the same reference signs.

For example, as shown in FIG. 11, a seal plate 90 includes a support part 92 n the discharge part 74 of the valve guide 34, and the support part 92 supports the moisture-proof valve 36. The support part 92 is formed along a portion or whole of the circumferential surface of the discharge part 74 opened in a cylindrical shape, for example. The support part 92 includes a discharge path 94 in a central portion of the discharge part 74, the discharge path 94 has a diameter at least equal to or greater than that of the opening part 20 of the stopper wall 64, and the support part 92 is formed into a hollow cylindrical shape. The support part 92 has a length at least equal to that of the discharge part 74 in the flow direction of the gas G.

The support part 92 supports the moisture-proof valve 36, which is placed on, for example, the flange part 60 side, at a portion facing the discharge part 74.

As a result, in the seal plate 90, the installation position and the shape of the moisture-proof valve 36 are maintained by the placement on the support part 92, as well as the contact resistance with the inner wall surface of the through-hole 8.

For example, the support part 92 may be made of a resin material, a plastic material, or a metal material. For example, the support part 92 may be a component independent of the valve guide 34 or may be formed integrally with the valve guide 34. For example, the support part 92 may include therein a gas flow path allowing passage of a portion of the gas G, a slit for weight reduction, etc.

Effects of Seventh Embodiment

According to this configuration, the following effects can be expected in addition to the effects of the embodiments described above.

(1) By supporting the moisture-proof valve 36 in contact with the portion facing the discharge part 74 of the valve guide 34, the moisture-proof valve 36 can be prevented from deforming due to a pressure drop in the capacitor case where the seal plate is disposed.

(2) The moisture-proof valve 36 can be prevented from sinking or deforming toward the discharge part 74 due to pressing of the washer 38.

(3) Since the supporting area for the moisture-proof valve 36 is increased by the support part 92, the valve body of the moisture-proof valve 36 is maintained in the facing direction relative to the opening part 20 of the stopper wall 64, so that the pressure loss can be prevented with respect to the discharge of the gas G.

(4) Since a contact area of a flat surface portion of the moisture-proof valve 36 is increased by the valve guide 34 and the support part 92, a variation in the disposition direction of the moisture-proof valve 36 relative to the through-hole 8 and a deformation of the moisture-proof valve 36 are suppressed, so that foreign matter or moisture can be prevented from entering through the through-hole 8 from the outside.

(5) Since a portion of the moisture-proof valve 36 on the bottom surface side is supported by the support part 92, deformation or displacement of the moisture-proof valve 36 can be avoided in the through-hole 8.

Eighth Embodiment

Figure 12:
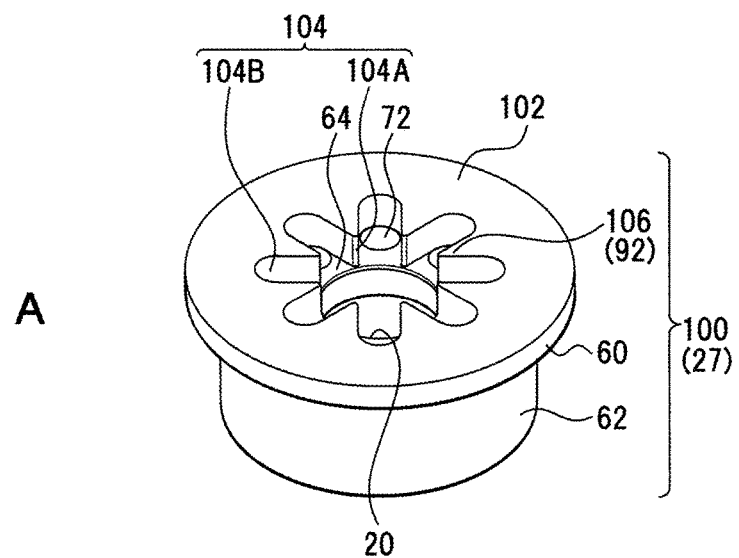
FIG. 12 is a diagram showing a configuration example of a valve guide according to an eighth embodiment.
Figure 12:
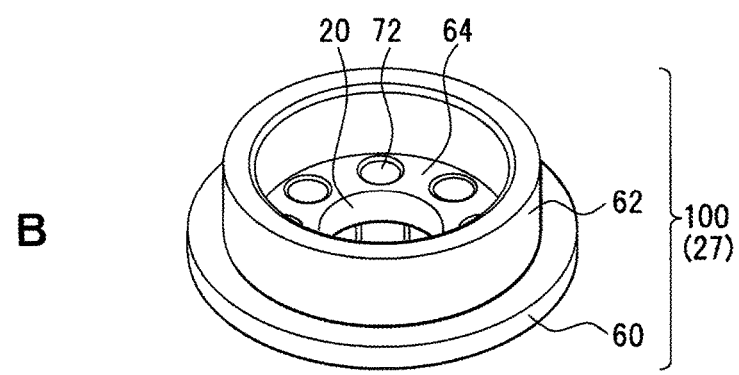

FIG. 12 shows a configuration example of a valve guide according to an eighth embodiment. The configuration shown in FIG. 12 is an example, and the present invention is not limited to this configuration.

For example, as shown in A of FIG. 12, a valve guide 100 includes flange part 60 brought into contact with the inner wall surface of the through-hole 8 of the seal plate 2 or locked to an engagement part formed on a portion of the inner wall surface, and a vertical wall part 62 formed into a cylindrical shape smaller in diameter than the flange part 60 and engaged with a portion of the pressure valve 12. The valve guide 100 is provided with the stopper wall 64, which suppresses a deformation due to expansion of the pressure valve 12, inside the vertical wall part 62 and includes the opening part 20 and the through-holes 72 allowing passage of the gas G in a central portion and a circumferential portion of the stopper wall 64.

The valve guide 100 includes a planar placement surface 102 on which the moisture-proof valve 36 is placed on the outer circumferential side of an end surface where the flange part 60 is formed, and the valve guide 100 includes a discharge part 104 for discharging the gas G to the outside of the valve guide 100 on the central side of the end surface. The discharge part 104 includes, for example, a first discharge part 104A being coaxial with the center of opening of the opening part 20 of the stopper wall 64 and having an opening diameter equal to or greater than that of the opening part 20, and multiple second discharge parts 104B opened radially along the plane of the flange part 60 from the center of opening of the first discharge part 104A. The second discharge parts 104B are formed in conformity with the opening positions of the through-holes 72 of the stopper wall 64. The first discharge part 104A and the second discharge parts 104B communicate with each other and can allow the gas G passing through the opening part 20 or the through-holes 72 to flow into the discharge part 104.

The end surface of the flange part 60 includes support wall 106 partitioning the adjacent second discharge parts 104B on the inner circumferential side of the placement surface 102. The support wall 106 is an example of a wall part of the present invention, is formed integrally with the placement surface 102 and forms a horizontal surface with respect to the placement surface 102 on the end surface of the flange part 60. As a result, the support wall 106 functions as a support member supporting a portion of the moisture-proof valve 36 placed thereon. For example, portions of the support wall 106 each have a size and a position set depending on the formation positions and the number of the through-holes 72 and may have all the same shape or different shapes.

As shown in B of FIG. 12, the storage part 16 receiving the pressure valve 12 expanded due to the generation of the gas G is opened on the vertical wall part 62 side of the valve guide 100, and the gas G is allowed to flow from the storage part 16 side to the opening part 20 and the through-holes 72 of the stopper wall 64.

Figure 13:
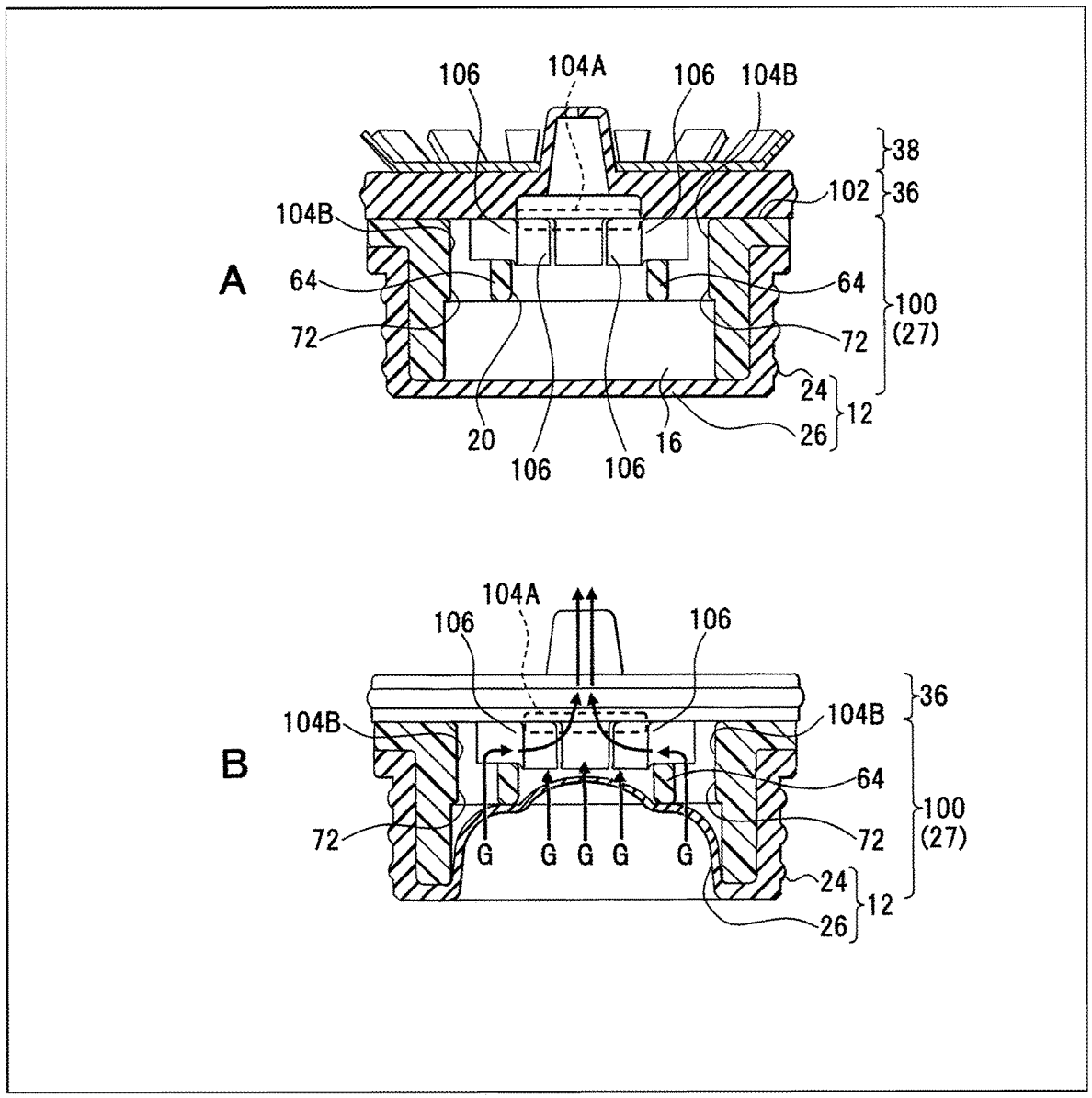
FIG. 13 is a diagram showing a state example in which a moisture-proof valve is disposed on the valve guide.

When the valve guide 100 is disposed in the through-hole 8, for example, as shown in A of FIG. 13, the outer circumference of the stopper wall 64 and an opening portion on the storage part 16 side are covered by the pressure valve 12. The moisture-proof valve 36 is disposed on the placement surface 102 on the end surface side of the flange part 60 of the valve guide 100, and the washer 38 pressing the upper surface side of the moisture-proof valve 36 is disposed. The moisture-proof valve 36 placed on the end surface of the valve guide 100 has, for example, an outer circumferential surface side placed on the placement surface 102 of the flange part 60 and a portion of the inner circumferential side placed on the support wall 106. The pressing force of the washer 38 is applied, for example, to the placement surface 102 and the support wall 106.

When the moisture-proof valve 36 is placed on the valve guide 100, the first discharge part 104A is arranged to face a gas discharge part of the moisture-proof valve 36. In the second discharge parts 104B opened on the through-holes 72, the opening portions on the flange part 60 side are brought into a sealed state by the moisture-proof valve 36. As a result, for example, as shown in B of FIG. 13, the second discharge parts 104B allow the gas G passing through the through-holes 72 to flow toward the first discharge part 104A in communication therewith.

Therefore, the support wall 106 supports the bottom side of the moisture-proof valve 36 and constitutes the second discharge parts 104B as discharge parts causing the gas G to flow from the through-holes 72 toward the first discharge part 104A.

Effects of Eighth Embodiment

According to this configuration, the following effects can be expected in addition to the effects of the embodiments described above.

(1) Since the contact area with the moisture-proof valve 36 is increased by the support wall 106 formed in the valve guide 100, the moisture-proof valve 36 can be prevented from deforming due to a pressure drop in the capacitor case where the seal plate is disposed.

(2) Since the contact area with the moisture-proof valve 36 is increased by the support wall 106 formed in the valve guide 100, the moisture-proof valve 36 can be prevented from sinking or deforming due to pressing of the washer 38.

(3) Since the displacement and deformation of the moisture-proof valve 36 are suppressed by the valve guide 100, foreign matter or moisture can be prevented from entering through the through-hole 8 from the outside.

(4) The second discharge part 104B partitioned by the support wall 106 can cause the gas G passing through the through-holes 72 to flow toward the discharge opening of the moisture-proof valve 36, and the gas discharge function of the seal plate 2 can be maintained.

Experimental Example 1

Figure 14:
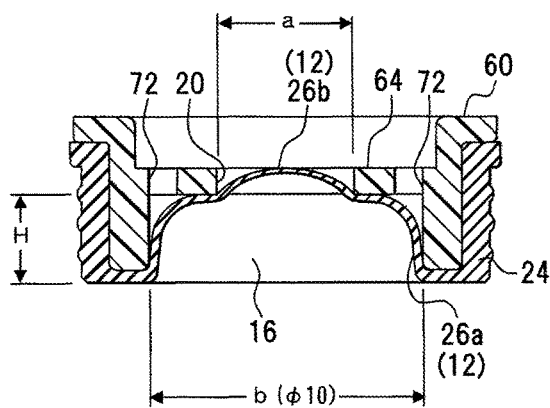
FIG. 14 is a diagram showing Experimental Example 1.

A relationship between the configuration of the opening part of the valve guide and the operating pressure will be described. FIG. 14 is a diagram showing Experimental Example 1.

In Experimental Example 1, for example, the valve guide 70 illustrated in the fifth embodiment was used and, as shown in A of FIG. 14, the through-holes 72 were included on the outer circumferential side of the stopper wall 64. An opening diameter a of the opening part 20 was varied in the valve guide 70 to make a comparison in operating pressure of a pressure valve. In Experimental Example 1, for example, the opening diameter a of the opening part 20 was set to four values, i.e., ø3 [mm], ø4 [mm], ø5 [mm], and ø7 [mm]. A diameter b of the storage part 16 was set to ø10 [mm]. For a comparative example, an opening diameter of a valve guide without the stopper wall 64 was set to ø10 [mm].

The valve guide 70 with the opening part 20 set to each dimension was disposed on the capacitor, and the operating pressure was measured when the pressure valve 12 was broken.

As a result of this measurement, as shown in B of FIG. 14, when the opening diameter a was ø3 [mm], the breakage occurred at the capacitor internal pressure of 1.0 [MPa], which was the highest operating pressure. When the opening diameter a was ø4 [mm], the breakage occurred at the capacitor internal pressure of 0.77 [MPa]; when the opening diameter a was ø5 [mm], the breakage occurred at the capacitor internal pressure of 0.60 [MPa]; and when the opening diameter a was ø7 [mm], the breakage occurred at the capacitor internal pressure of 0.45 [MPa]. When the opening diameter a without the stopper wall 64 was ø10 [mm], the breakage occurred at the capacitor internal pressure of 0.31 [MPa].

From the results described above, when the valve guide 70 includes the stopper wall 64 suppressing the displacement of the valve body part 26 in the storage part 16 as in the present invention, the valve guide 70 can increase the operating pressure of the pressure valve 12.

When the opening diameter of the opening part 20 discharging the gas is smaller, the area of the stopper wall 64 supporting the valve body part 26 becomes larger, and the operating pressure of the valve body part 26 can be maintained high.

When the opening part 20 is narrowed, the gas discharge amount may be reduced. In this case, the diameter of the opening part 20 may be set in accordance with the operating pressure of the valve body part 26 required for the capacitor using the valve guide 70 and the pressure valve 12, so as to adjust the operating pressure and the gas discharge function.

Experimental Example 2

Figure 15:
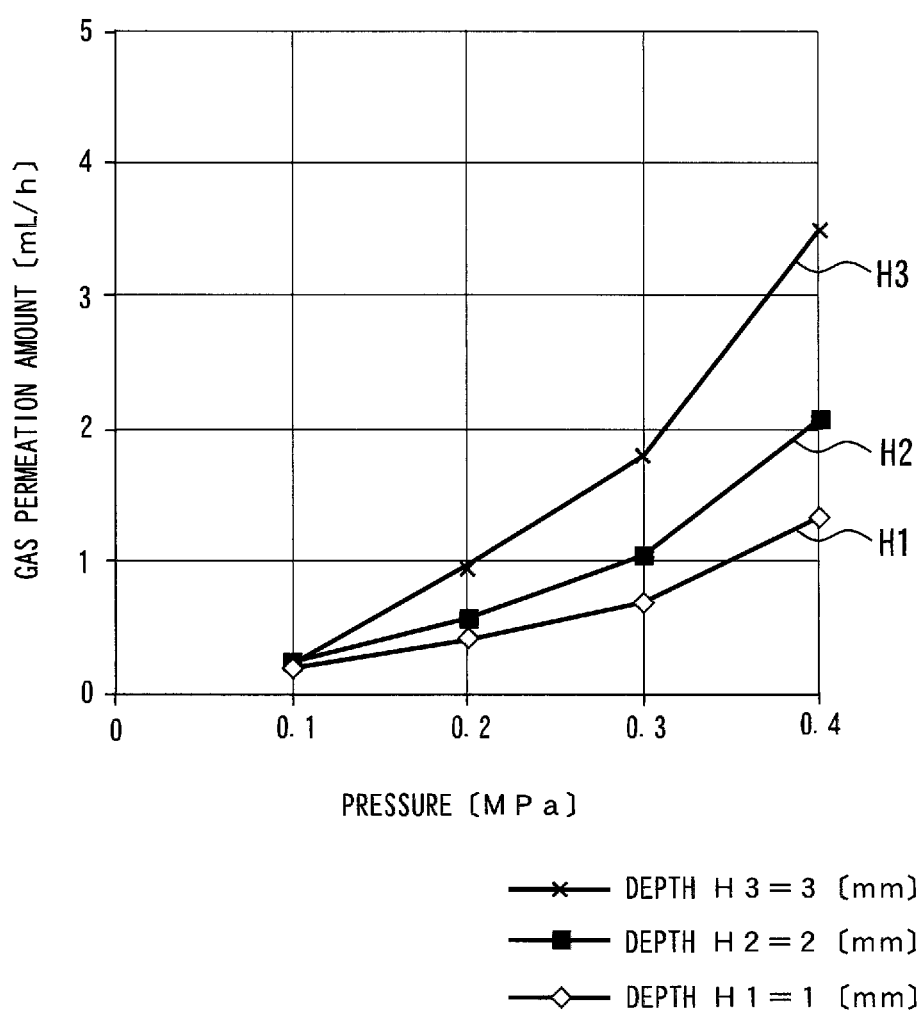
FIG. 15 is a diagram showing Experimental Example 2.

A relationship between the depth of the storage part of the valve guide and the gas permeation amount will be described. FIG. 15 is a diagram showing Experimental Example 2.

In Experimental Example 2, it is measured how a depth H of the storage part 16 of the valve guide affects the gas permeation amount. In this example, a flow rate of the gas passing through the valve guide or the seal plate was measured when the depth H of the storage part 16 was H1=1 [mm], H2=2 [mm] and H3=3 [mm].

As shown in FIG. 15, this measurement result shows that, for all the depths H1, H2, and H3, the gas permeation amount [mL/h] increases as the internal pressure [MPa] in the case becomes larger. At the same internal pressure, the gas permeation amount increases as the depth H of the storage part becomes deeper.

From the measurement described above, the depth of the storage part 16 affects the expansion amount of the valve body part 26, and the expansion amount of the valve body part 26 becomes larger as the depth increases from H1 to H2 and H3. This clarifies that when the expansion amount becomes larger, the valve body part 26 is made thinner, which increases the gas permeation amount.

From this result, the valve guide may be adjusted in terms of the depth of the storage part 16 in accordance with a gas discharge amount required for the capacitor, for example. Since the expansion amount of the valve body part 26 is increased by increasing the depth of the storage part 16, the depth H of the storage part 16 may be set in consideration of a value of the operating pressure required for the pressure valve 12.

Experimental Example 3

A relationship between the shape of the valve guide and the operating pressure will be described. FIG. 16 is a diagram showing Experimental Example 3.

In Experimental Example 3, a relationship of the operating pressure to the depth of the storage part 16 and the presence/absence of the ribs 84 of the valve guide was measured.

In Experimental Example 3, the valve guide 80 including the ribs 84 described in the sixth embodiment was used, and the diameter X of the virtual opening space 86 formed by the tip portions of the ribs 84 is set equal to the opening diameter a of the opening part 20.

For the valve guide without the ribs 84, for example, the configuration described in the second embodiment was used. In this configuration, the opening diameter a was set to 5 [mm] in all the cases, and the depth of the storage part 16 was set to 3 [mm] when the ribs were not included and to 3 [mm] and 1.5 [mm] when the ribs were included.

As a result of this measurement, as shown in FIG. 16, the operating pressure value was equal to or close to 0.6 [MPa] in all the measurements. This measurement result clarifies that the operating pressure of the valve body part 26 is affected by the opening diameter a of the opening part 20 brought into contact with the expanded valve body part 26, rather than the presence/absence of the ribs 84 or the depth of the storage part 16. Specifically, the operating pressure of the pressure valve 12 is determined by the size of the second expanding part 26b, which expands to enter the inside of the opening part 20 allowing passage of the gas, of the expanded valve body part 26, regardless of the area or volume of the first expanding part 26a, of which the displacement is suppressed by the stopper wall 64 and the vertical wall part 62, of the expanded valve body part 26.

Therefore, under the conditions of Experimental Example 3, the opening diameter a of the opening part 20 may be set in accordance with the operating pressure required for the pressure valve.

Although the diameter X of the virtual opening space 86 formed by the tip portions of the ribs 84 is made equal to the opening diameter a of the opening part 20 in the conditions of Experimental Example 3, it is presumed that a different result is obtained if the diameter X of the opening space is made different from the opening diameter a of the opening part 20, for example.

(1) It is assumed that the opening diameter a is larger than the diameter X of the opening space (a>X), i.e., the length of the ribs 84 projected into the storage part 16 from the wall surface of the vertical wall part 62 is longer than the width of the stopper wall 64 and the ribs 84 are projected inside the opening part 20 in the storage part 16. In this case, the second expanding part 26b having the size of the diameter X formed by the ribs 84 is formed in the valve body part 26, the operating pressure of the valve body part 26 is considered as depending on the size of the diameter X.

(2) When the opening diameter a is smaller than the diameter X of the opening space (a<X), the valve body part 26 has the second expanding part 26b formed in the opening part 20 inside the ribs 84, and therefore, the operating pressure of the valve body part 26 is considered as depending on the size of the opening diameter a.

Experimental Example 4

A relationship between the shape of the valve guide and the gas permeation amount will be described. FIG. 17 is a diagram showing Experimental Example 4.

In Experimental Example 4, the gas permeation amount was measured based on the presence/absence of the through-holes 72 for gas discharge included on the outer circumferential side of the stopper wall 64 and the presence/absence of the ribs 84, and the results were compared.

In the valve guide used for measurement, the opening diameter a of the opening part 20 was set to 5 [mm], and the depth H of the storage part 16 was set to 3 [mm]. Additionally, (1) neither the through-holes 72 nor ribs were included; (2) the eight through-holes 72 of ø1 [mm] were included and no ribs were included; (3) the through-holes 72 were not included and the ribs 84 were included; and (4) the five through-holes 72 of ø1 [mm] were included and the ribs 84 were included.

For a comparative example, the opening diameter a of the opening part without the stopper wall 64 was set to ø10 [mm].

In the valve guide having such conditions, the gas permeation amount was measured when the internal pressure was set to 0.4 [MPa].

As a result of this measurement, as shown in FIG. 17,
(1) when neither the through-holes 72 nor ribs were included, the gas permeation amount of 1.4 [mL/h] was measured;
(2) when the eight through-holes 72 of ø1 [mm] were included and no ribs were included, the gas permeation amount of 3.5 [mL/h] was measured;
(3) when the through-holes 72 were not included and the ribs 84 were included, the gas permeation amount of 4.5 [mL/h] was measured; and
(4) when the five through-holes 72 of ø1 [mm] were included and the ribs 84 were included, the gas permeation amount of 7.3 [mL/h] was measured.

In the valve guide of the comparative example, the pressure valve was actuated, and the valve body part was broken.

From this measurement result, a comparison between (1) and (2) clarifies that the gas permeability is improved by forming the through-holes 72 in the stopper wall 64. A comparison between (1) and (3) clarifies that including the ribs 84 in the storage part 16 changes the expansion state of the valve body part 26, for example, and improves the gas permeability.

A comparison between the results of (2) and (4) clarifies that the gas permeability is improved by including the ribs 84 as compared to when the number of the through-holes 72 is increased.

Other Embodiments

Modifications of the embodiments described above will be listed below.

(1) In the description of the embodiments, when the ribs 84 are formed in the valve guide 80, the diameter X of the virtual opening space formed by the ribs 84 is equal to the opening diameter a of the opening part 20 on the storage part 16; however, the embodiments are not limited thereto. The ribs 84 may be projected more than the opening part 20 as shown in A of FIG. 18, for example. In this case, the diameter X of the virtual opening space 86 formed at the tip portions of the ribs 84 is smaller than an opening diameter a1.

Figure 18:
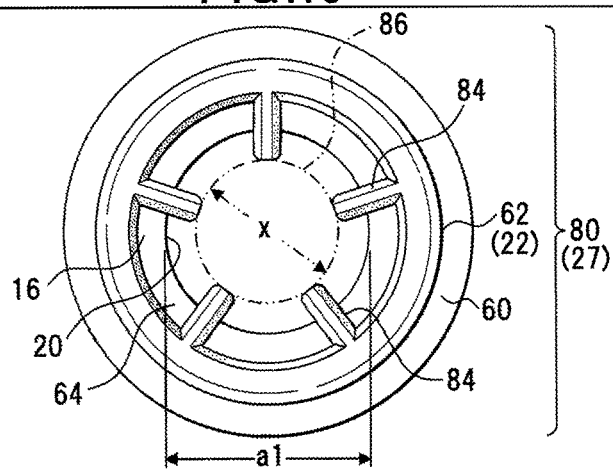
FIG. 18 is a diagram showing a configuration example of a valve guide according to another embodiment.
Figure 18:
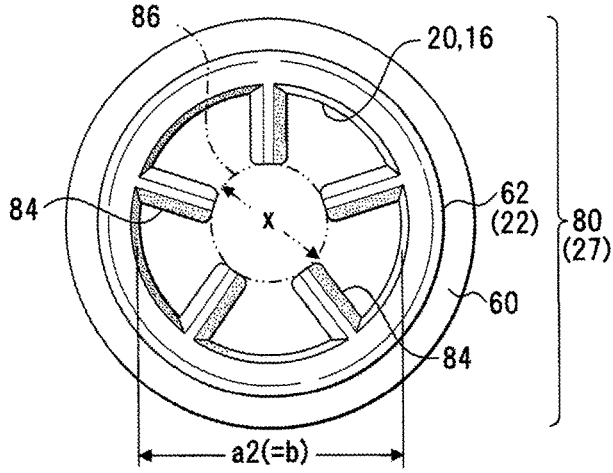
Figure 18:
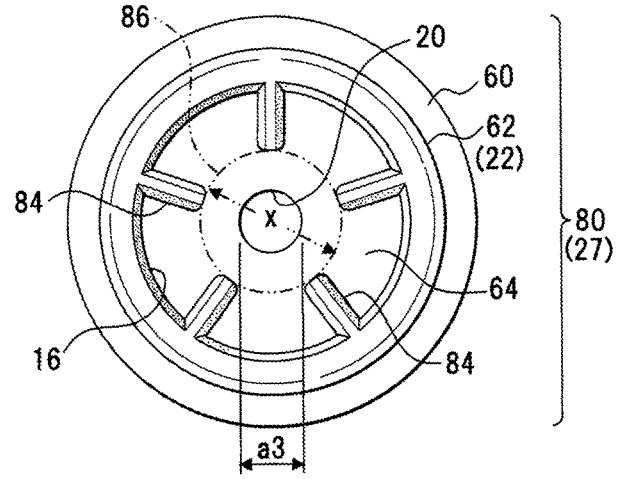

The valve guide 80 may be configured to include the ribs 84 without the stopper wall 64 as shown in B of FIG. 18, for example. An opening diameter a2 of the opening part 20 on the storage part 16 becomes larger than the diameter X of the virtual opening space 86. In this case, the valve body part 26 is in contact with the ribs 84 due to the internal pressure on the capacitor case side, and the second expanding part 26b is defined between the ribs 84 and inside the diameter X of the virtual opening space 86. Even with this configuration, the valve body part 26 is expanded and thinned, so that the gas discharge function is enhanced, and the gas can efficiently be discharged. Since the valve body part 26 is fixedly supported by the contact with the ribs 84, the thinned state is maintained so that the operating state can be improved.

Furthermore, for example, as shown in C of FIG. 18, the ribs 84 may allow the stopper wall 64 to be projected more than the ribs 84 to reduce the diameter of the opening part 20. In this case, the diameter X of the virtual opening space 86 formed by the tip portions of the ribs 84 is larger than an opening diameter a3.

(2) In the description of the embodiments, for the storage part 16 of the valve guide, the large-diameter opening part 20 is formed in a central portion of the flow path through which the gas flows; however, the embodiments are not limited thereto.

Figure 19:
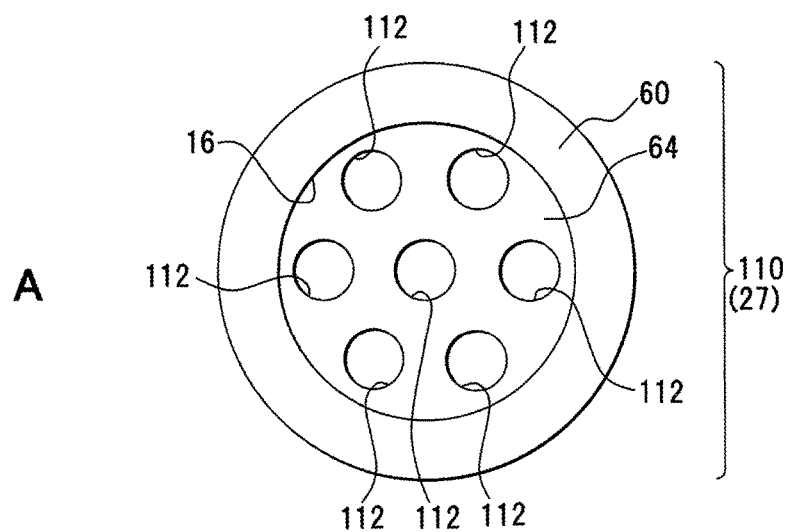
FIG. 19 is a diagram showing a configuration example of a valve guide according to another embodiment.
Figure 19:
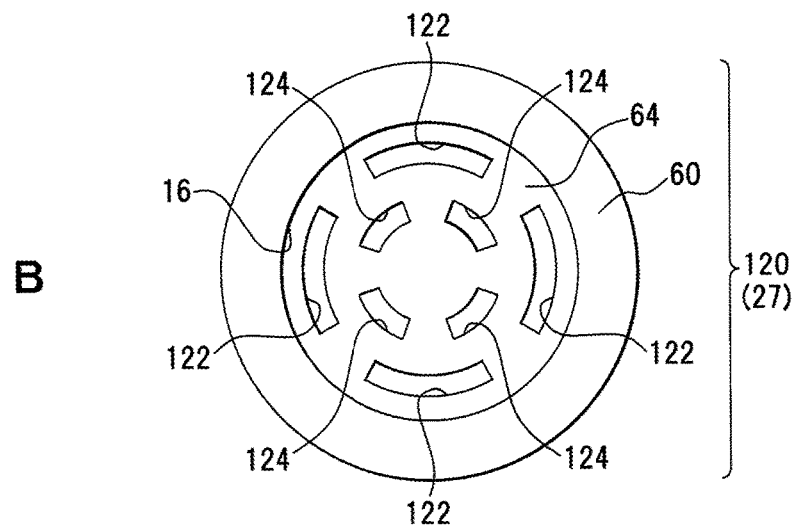

For example, as shown in A of FIG. 19, the valve guide 110 may be provided with multiple opening parts 112 having the same or different diameters on the surface of the stopper wall 64 covering the flow path of the storage part 16. In this case, for example, one or more of the opening parts 112 may be included at least in a portion facing the central axis of the storage part 16.

Alternatively, for example, as shown in B of FIG. 19, the valve guide 120 may be provided with multiple opening parts 122, 124 having predetermined widths.

(3) In the description of the embodiments, the opening part 20 and the through-holes 72 are opened in a circular shape; however, the embodiments are not limited thereto. The opening part 20 and the through-holes 72 may be opened in a square shape or other shapes.

As described above, the most preferable embodiments etc. of the present invention have been described. The present invention is not limited to the above description and can variously be modified and altered by those skilled in the art based on the spirit of the invention described in claims or disclosed in the description of embodiments. These modifications and alterations naturally fall within the scope of the present invention.

INDUSTRIAL APPLICABILITY

According to the seal plate, the capacitor and the method for manufacturing a seal plate of the present invention, since the seal plate includes a storage part for storing a valve body part allowing passage of a gas and expanding due to an internal pressure in a capacitor case and a stopper wall brought into contact with a portion of the expanding valve body part to suppress displacement thereof, the valve body part is maintained in a thinned state to achieve an improvement in gas permeability and an improvement in operating pressure, which is useful.

REFERENCE SIGNS LIST 2, 30, 90 seal plate
4 main body part
6, 60 flange part
8, 72 through-hole
10, 28, 64 stopper wall
12 pressure valve
12a, 26a first expanding part
12b, 26b second expanding part
12c, 26c third expanding part
14-1, 14-2 external terminals
16 storage part
18, 74 discharge part
20, 112, 122, 124 opening part
22, 62 vertical wall part
24 side surface part
26 valve body part
27, 34, 70, 80, 100, 110, 120 valve guide
29 flange part
36 moisture-proof valve
38 washer
40-1, 40-2 current collector plate
50 capacitor
52 exterior case
54 capacitor element
56 tab
84 rib
86 opening space
92 support part
94 discharge path
102 placement surface
104 discharge part
104A first discharge part
104B second discharge part
106 support wall

The invention claimed is:

1. A seal plate that seals an opening part of a capacitor case, the seal plate comprising:
a main body part including a through-hole for discharging a gas in the capacitor case;
a pressure valve arranged to cover the through-hole and including a valve body part allowing passage of the gas;
a storage part formed in the through-hole to receive the valve body part expanded due to a pressure in the capacitor case; and
a stopper that includes an opening part for discharging the gas passing through the valve body part and that comes into contact with the valve body part in the storage part to deform the valve body part,
wherein the opening part of the stopper comes into contact a portion of the expanded valve body part.

2. The seal plate according to claim 1, wherein the stopper comes into contact with a portion of the valve body part in the storage part to allow the valve body part to expand in multiple stages.

3. The seal plate according to claim 2, wherein the stopper includes one or more opening parts as the opening part.

4. The seal plate according to claim 3, wherein
the stopper is made up of a valve guide arranged inside the through-hole, and the valve guide includes a stopper wall covering a portion of the through-hole and a vertical wall part communicating with the stopper wall and vertically disposed along an inner wall of the through-hole, wherein
the vertical wall part comes into contact with a portion of the pressure valve to fixedly support the pressure valve in the through-hole, and wherein
the storage part is formed in a portion surrounded by the stopper wall and the vertical wall part.

5. The seal plate according to claim 2, wherein the opening part includes a first opening part opened to the central side of the storage part and a second opening part located around the first opening part and having a smaller opening diameter than the first opening part.

6. The seal plate according to claim 5, further comprising a first discharge part vertically disposed on the downstream side in a gas discharge direction relative to the stopper and allowing the gas passing through the first opening part to flow downstream of the through-hole, and a wall part forming a second discharge part allowing the gas passing through the second opening part to flow toward the first discharge part.

7. The seal plate according to claim 5, wherein
the stopper is made up of a valve guide arranged inside the through-hole, and the valve guide includes a stopper wall covering a portion of the through-hole and a vertical wall part communicating with the stopper wall and vertically disposed along an inner wall of the through-hole, wherein
the vertical wall part comes into contact with a portion of the pressure valve to fixedly support the pressure valve in the through-hole, and wherein
the storage part is formed in a portion surrounded by the stopper wall and the vertical wall part.

8. The seal plate according to claim 2, wherein the stopper includes a plurality of ribs projected into the storage part for the plurality of ribs to be brought into contact with the expanded valve body part.

9. The seal plate according to claim 8, wherein the ribs are arranged at predetermined intervals along an inner circumferential surface of the through-hole.

10. The seal plate according to claim 9, wherein
the stopper is made up of a valve guide arranged inside the through-hole, and the valve guide includes a stopper wall covering a portion of the through-hole and a vertical wall part communicating with the stopper wall and vertically disposed along an inner wall of the through-hole, wherein
the vertical wall part comes into contact with a portion of the pressure valve to fixedly support the pressure valve in the through-hole, and wherein
the storage part is formed in a portion surrounded by the stopper wall and the vertical wall part.

11. The seal plate according to claim 8, wherein
the stopper is made up of a valve guide arranged inside the through-hole, and the valve guide includes a stopper wall covering a portion of the through-hole and a vertical wall part communicating with the stopper wall and vertically disposed along an inner wall of the through-hole, wherein
the vertical wall part comes into contact with a portion of the pressure valve to fixedly support the pressure valve in the through-hole, and wherein
the storage part is formed in a portion surrounded by the stopper wall and the vertical wall part.

12. The seal plate according to claim 2, wherein
the stopper is made up of a valve guide arranged inside the through-hole, and the valve guide includes a stopper wall covering a portion of the through-hole and a vertical wall part communicating with the stopper wall and vertically disposed along an inner wall of the through-hole, wherein
the vertical wall part comes into contact with a portion of the pressure valve to fixedly support the pressure valve in the through-hole, and wherein
the storage part is formed in a portion surrounded by the stopper wall and the vertical wall part.

13. The seal plate according to claim 2, comprising a moisture-proof valve disposed in the through-hole on the downstream side in a gas discharge direction relative to the stopper and brought into an open state only when the gas passing through the valve body part is discharged from the through-hole to the outside.

14. The seal plate according to claim 13, wherein the moisture-proof valve is disposed away from the stopper in the through-hole.

15. The seal plate according to claim 13, further comprising a discharge part allowing a gas passing through the pressure valve to flow in between the stopper and the moisture-proof valve, regulating a flow of the gas, and allowing the gas to flow toward the moisture-proof valve.

16. The seal plate according to claim 13, further comprising a support part having one end side disposed on the stopper and the other end side on which a portion of the moisture-proof valve is placed.

17. A capacitor comprising:
a capacitor element;
a capacitor case storing the capacitor element; and
a seal plate sealing the opening part of the capacitor case, wherein
the seal plate includes
a main body part including a through-hole for discharging a gas in the capacitor case,
a pressure valve arranged to cover the through-hole and including a valve body part allowing passage of the gas,
a storage part formed in the through-hole to receive the valve body part expanded due to a pressure in the capacitor case, and
a stopper that includes an opening part for discharging the gas passing through the valve body part and that comes into contact with the valve body part in the storage part to deform the valve body part,
wherein the opening part of the stopper comes into contact with a portion of the expanded valve body part.

18. The capacitor according to claim 17, wherein the stopper comes into contact with a portion of the valve body part in the storage part to allow the valve body part to expand in multiple stages.

19. A method for manufacturing a seal plate that seals an opening part of a capacitor case, the method comprising:
forming a main body part including a through-hole for discharging a gas in the capacitor case;
disposing, on the through-hole, a pressure valve including a valve body part allowing passage of the gas; and
disposing, in the through-hole, a stopper that includes an opening part for discharging the gas passing through the valve body part and that comes into contact with the valve body part to deform the valve body part in a storage part receiving the valve body part expanded due to an internal pressure in the capacitor case,
wherein the opening part of the stopper comes into contact a portion of the expanded valve body part.

20. The method according to claim 19, wherein the stopper comes into contact with a portion of the valve body part in the storage part to allow the valve body part to expand in multiple stages.

* * * * *